United States Patent
Conner et al.

(10) Patent No.: US 12,433,615 B2
(45) Date of Patent: Oct. 7, 2025

(54) ORTHOPAEDIC SYSTEMS, TRANSFER GUIDE ASSEMBLIES, AND METHODS OF REPAIR

(71) Applicant: ARTHREX, INC., Naples, FL (US)

(72) Inventors: Devin Conner, Naples, FL (US); Alex Bautsch, Naples, FL (US)

(73) Assignee: ARTHREX, INC., Naples, FL (US)

( * ) Notice: Subject to any disclaimer, the term of this patent is extended or adjusted under 35 U.S.C. 154(b) by 117 days.

(21) Appl. No.: 18/538,057

(22) Filed: Dec. 13, 2023

(65) Prior Publication Data

US 2024/0188970 A1 Jun. 13, 2024

Related U.S. Application Data

(60) Provisional application No. 63/432,176, filed on Dec. 13, 2022.

(51) Int. Cl.
*A61B 17/17* (2006.01)
*A61B 17/00* (2006.01)

(52) U.S. Cl.
CPC .............. *A61B 17/1764* (2013.01); *A61B 2017/00367* (2013.01); *A61B 2017/00982* (2013.01)

(58) Field of Classification Search
CPC ................................. A61B 17/1764
See application file for complete search history.

(56) References Cited

U.S. PATENT DOCUMENTS

| | | | |
|---|---|---|---|
| 5,141,513 A | * | 8/1992 | Fortune .............. A61B 17/1735 606/53 |
| 7,309,339 B2 | | 12/2007 | Cusick et al. |
| 7,736,368 B2 | * | 6/2010 | Couture ................ A61B 34/20 606/88 |
| 8,118,815 B2 | | 2/2012 | van der Walt |
| 8,147,496 B2 | | 4/2012 | Couture et al. |
| 8,277,455 B2 | | 10/2012 | Couture et al. |
| 8,361,076 B2 | | 1/2013 | Roose et al. |
| 8,764,760 B2 | | 7/2014 | Metzger et al. |
| 8,801,725 B2 | | 8/2014 | Ritter et al. |
| 9,005,207 B2 | | 4/2015 | Dodds et al. |
| 9,113,957 B2 | | 8/2015 | Axelson, Jr. et al. |
| 9,138,237 B2 | | 9/2015 | Meade et al. |
| 9,198,732 B2 | | 12/2015 | Iannotti et al. |
| 9,220,509 B2 | | 12/2015 | Boyer et al. |
| 9,579,107 B2 | | 2/2017 | Schoenefeld |
| 9,717,512 B2 | * | 8/2017 | Schmalzried ...... A61B 17/1764 |
| 9,833,249 B2 | | 12/2017 | Bertram, III |
| 9,931,168 B2 | | 4/2018 | Brown et al. |
| 10,139,807 B2 | | 11/2018 | Park |
| 10,299,807 B2 | | 5/2019 | Murphy |
| 10,624,752 B2 | | 4/2020 | Sikora et al. |
| 10,806,465 B2 | | 10/2020 | Plaskos et al. |

(Continued)

FOREIGN PATENT DOCUMENTS

WO 9519141 7/1995

*Primary Examiner* — Christian A Sevilla

(74) *Attorney, Agent, or Firm* — Carlson, Gaskey & Olds, P.C.

(57) ABSTRACT

This disclosure relates to surgical planning systems, instrumentation and methods for modifying a patient anatomy. The planning systems and instrumentation disclosed herein may be utilized for placement of various surgical devices, including a guide member for establishing a position of another surgical device relative to the anatomy.

20 Claims, 20 Drawing Sheets

(56) References Cited

U.S. PATENT DOCUMENTS

| | | |
|---|---|---|
| 10,939,921 B2 | 3/2021 | Jamali |
| 2002/0133161 A1* | 9/2002 | Axelson, Jr. ......... A61B 17/154 |
| | | 606/88 |
| 2008/0140081 A1 | 6/2008 | Heavener et al. |
| 2018/0177612 A1* | 6/2018 | Trabish .................. A61B 90/06 |

* cited by examiner

ORTHOPAEDIC SYSTEMS, TRANSFER GUIDE ASSEMBLIES, AND METHODS OF REPAIR

CROSS-REFERENCE TO RELATED APPLICATION

The present application claims priority to U.S. Provisional Application No. 63/432,176 filed Dec. 13, 2022.

BACKGROUND

This disclosure relates to surgical devices and methods for repairing bone defects along bones and joints.

Many bones of the human musculoskeletal system include articular surfaces. The articular surfaces articulate relative to other bones to facilitate different types and degrees of joint movement. The articular surfaces can erode (e.g., experience bone loss) over time due to repeated use or wear or can fracture as a result of a traumatic impact. These types of bone defects can cause joint instability and pain.

Bone deficiencies may occur along the articular surfaces of bones. Some techniques may utilize a guide to set a position of a guide pin. The guide pin may be used for guiding another instrument to modify a surface of the bone.

SUMMARY

This disclosure relates to planning systems, alignment guides and methods of performing a surgical procedure. The planning systems, alignment guides and methods may be utilized for planning and implementing orthopaedic procedures to restore functionality to bones and joints. The disclosed alignment guides may be utilized for positioning one or more guide members relative to bone or other tissue.

A transfer guide assembly for an orthopaedic procedure of the present disclosure may include a guide body. A plurality of guide passages may be dimensioned to receive respective guide elements insertable in bone. First and second alignment arms may be coupled to the guide body. The first alignment arm may include a first engagement surface. The second alignment arm may include a paddle having a second engagement surface. A geometry of the first engagement surface may differ from a geometry of the second engagement surface. First and second contact legs may be coupled to the guide body. The first and second contact legs may include respective first and second pads. The first and second pads may have respective first and second contact surfaces. The first and second engagement surfaces and the first and second contact surfaces may be dimensioned to contact bone.

A kit for an orthopaedic procedure of the present disclosure may include a guide body. A set of contact legs may differ in at least one dimension from each other and may be interchangeably securable to the guide body. Each of the contact legs may include a pad having a respective contact surface dimensioned to contact bone. A set of first alignment arms may differ in at least one dimension from each other and may be interchangeably securable to the guide body. Each of the first alignment arms may include a first engagement surface dimensioned to contact bone. A set of second alignment arms may each include a paddle having a second engagement surface. A geometry of the first engagement surface may differ from a geometry of the second engagement surface. A selected pair of the contact legs, a selected one of the second alignment arms, and a selected one of the set of alignment arms may be securable to the guide body to establish an assembly. The assembly may include a plurality of guide passages dimensioned to receive respective guide elements insertable in bone.

A method of performing an orthopaedic procedure of the present disclosure may include configuring an alignment guide. The alignment guide may include a guide body, first and second alignment arms and first and second contact legs coupled to the guide body, and a plurality of guide passages. The first alignment arm may include a first engagement surface. The second alignment arm may include a paddle establishing a second engagement surface. A geometry of the first engagement surface may differ from a geometry of the second engagement surface. The first and second contact legs may include respective first and second pads. The configuring step may include setting a position of each of the first and second alignment arms and the first and second contact legs relative to the guide body based on positions of a set of anatomical landmarks. The method may include positioning the alignment guide relative to a bone according to the set positions such that the engagement surfaces of the first and second alignment arms and the first and second contact legs may establish contact with contact points along the bone that substantially correspond to the respective anatomical landmarks, and then inserting a plurality of guide elements through the respective guide passages and into the bone at insertion positions that may substantially correspond to respective insertion locations.

A transfer guide assembly for an orthopaedic procedure of the present disclosure may include a guide body. A plurality of guide passages may be dimensioned to receive respective guide elements insertable in bone. First and second alignment arms may be coupled to the guide body. The first alignment arm may include a first engagement surface. The second alignment arm may include a second engagement surface. A geometry of the first engagement surface may differ from a geometry of the second engagement surface. First and second contact legs may be coupled to the guide body. The first and second contact legs may include respective first and second contact surfaces. The first and second engagement surfaces and the first and second contact surface may be dimensioned to contact bone.

A method of performing an orthopaedic procedure of the present disclosure may include configuring an alignment guide. The alignment guide may include a guide body, first and second alignment arms and first and second contact legs coupled to the guide body, and a plurality of guide passages. The first alignment arm may include a first engagement surface. The second alignment arm may include a second engagement surface. A geometry of the first engagement surface may differ from a geometry of the second engagement surface. The configuring step may include setting a position of each of the first and second alignment arms and the first and second contact legs relative to the guide body based on positions of a set of anatomical landmarks. The method may include positioning the alignment guide relative to a bone according to the set positions such that the engagement surfaces of the first and second alignment arms and the first and second contact legs may establish contact with contact points along the bone that may substantially correspond to the respective anatomical landmarks, and then inserting a plurality of guide elements through the respective guide passages and into the bone at insertion positions that may substantially correspond to respective insertion locations.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
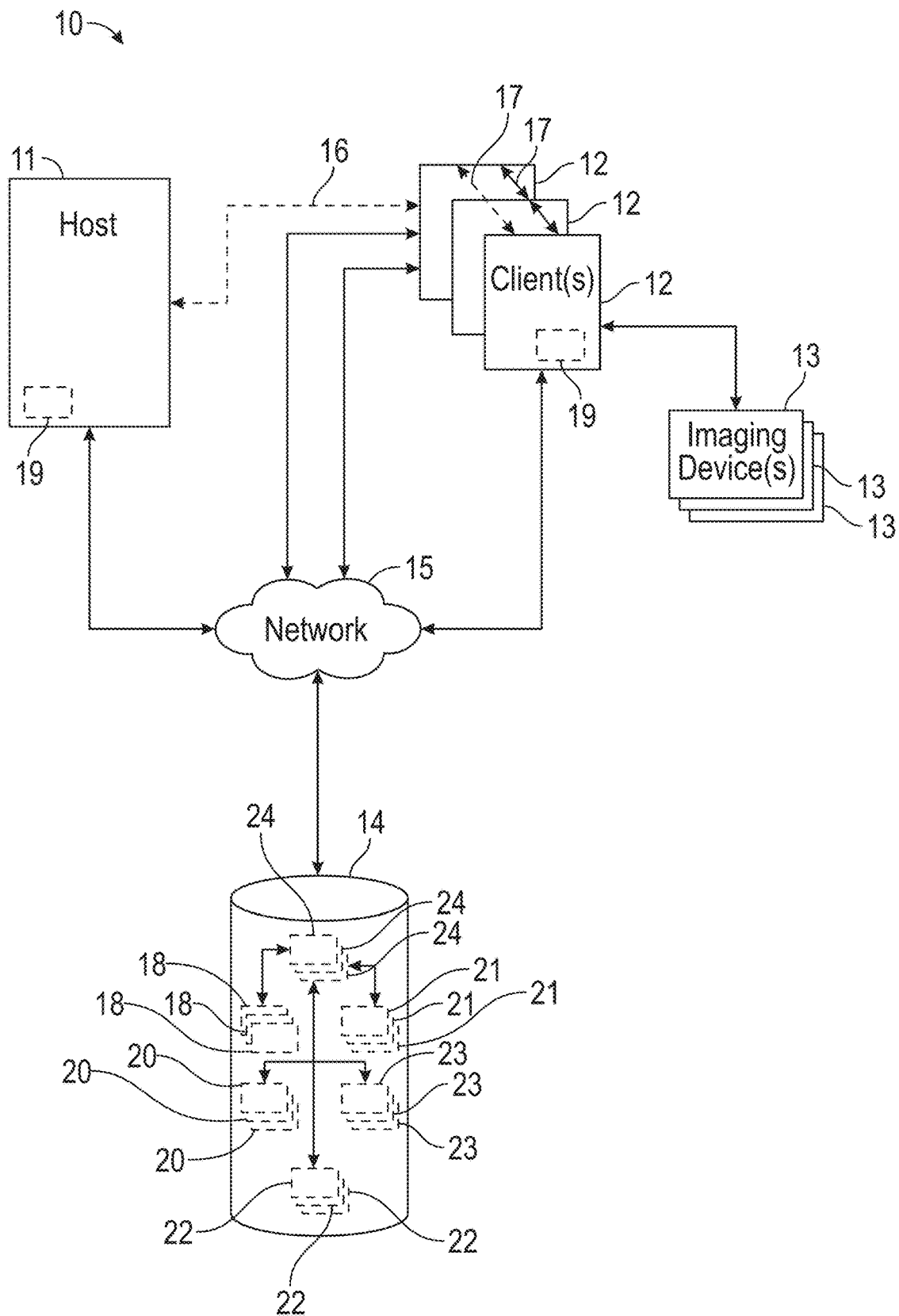
FIG. 1 schematically illustrates an exemplary surgical planning system.

This disclosure relates to surgical devices and methods for modifying anatomy of a patient. The instrumentation and systems described herein may be utilized in preparing a surface at a surgical site, including removing bone or other tissue for receiving an implant.

The disclosed systems, assemblies and methods may be utilized to treat various bones and joints, including knee, hip, shoulder, elbow and ankle joints. The disclosed systems, assemblies and methods may be utilized in various surgical procedures, including orthopaedic procedures such as a total knee arthroplasty which may include preparing a distal femur for receiving an implant.

The disclosed planning systems, and transfer guide assemblies and methods may be utilized for placement of one or more surgical devices relative to the patient anatomy. The surgeon or assistant may interact with the disclosed planning systems to establish, modify and/or approve a surgical plan. The surgical plan may specify a position and orientation of one or more guide elements, instruments or other surgical devices relative to the patient anatomy. Aspects of a surgical plan can be established based on the parameters, including various settings and dimensions associated with instrumentation to prepare a surgical site, including the disclosed transfer guide assemblies. The surgeon or clinical user may configure the transfer guide assembly according to associated parameters specified in the surgical plan. The disclosed alignment guide assemblies may be utilized to establish a precise orientation of guide elements, instruments or other surgical devices in a manner that may substantially conform to the surgical plan. The assembly may include components provided in a kit that may be interchangeable to accommodate different patient anatomies.

A transfer guide assembly for an orthopaedic procedure of the present disclosure may include a guide body. A plurality of guide passages may be dimensioned to receive respective guide elements insertable in bone. First and second alignment arms may be coupled to the guide body. The first alignment arm may include a first engagement surface. The second alignment arm may include a paddle having a second engagement surface. A geometry of the first engagement surface may differ from a geometry of the second engagement surface. First and second contact legs may be coupled to the guide body. The first and second contact legs may include respective first and second pads. The first and second pads may have respective first and second contact surfaces. The first and second engagement surfaces and the first and second contact surfaces may be dimensioned to contact bone.

In implementations, the first and second contact legs may be interchangeable with a set of contact legs that may differ in at least one dimension from each other. The first alignment arm may be interchangeable with a set of alignment arms that may differ in at least one dimension from each other.

In implementations, the first and second alignment arms and the first and second contact legs may be independently adjustable relative to the guide body in response to actuating a respective lock mechanism.

In implementations, the plurality of guide passages may include first and second guide passages that may extend through the first alignment arm. The plurality of guide passages may include third and fourth guide passages that may extend through the respective first and second contact legs.

In implementations, a reference plane may intersect the guide body. The first guide passage and the first engagement surface may be situated on a first side of the reference plane, but the second guide passage and the second engagement surface of the paddle may be situated on a second side of the reference plane. A terminal end of the paddle may be positioned between the guide body and the first and second guide passages relative to the reference plane.

In implementations, the guide body may include a bone facing sidewall and a second sidewall. The reference plane may extend through the bone facing and second sidewalls. The first and second contact legs may extend outwardly from the bone facing sidewall. The first and second alignment arms may extend outwardly the second sidewall.

In implementations, the first alignment arm may include a protrusion that may taper to a touchpoint establishing the first engagement surface. The second engagement surface of the paddle may have a substantially planar geometry.

In implementations, the first and second alignment arms may be independently moveable along a first reference plane relative to the guide body. The first engagement surface of the first alignment arm and the paddle may be aligned with, and may be movable along, the first reference plane. The guide body may be spaced apart from the first reference plane.

In implementations, the first and second contact legs may be independently moveable along a second reference plane relative to the guide body. The first reference plane may be transverse to the second reference plane. The first and second pads may be spaced apart from, but may be moveable in a first direction towards, the first reference plane. The first and second engagement surfaces of the first and second alignment arms may be spaced apart from, but may be moveable in a second direction towards, the second reference plane.

In implementations, at least one of the first engagement surface, the second engagement surface, the first contact surface and the second contact surface is dimensioned to substantially conform to a surface contour of a bone.

In implementations, the first and second engagement surfaces of the first and second alignment arms and the first and second contact surfaces of the first and second pads may be dimensioned to contact articular surfaces of a distal femur.

In implementations, the first engagement surface of the first alignment arm may be dimensioned to contact an anterior aspect of a first condyle. The second engagement surface of the second alignment arm may be dimensioned to contact an anterior aspect of a second condyle. The first contact surface of the first pad may be dimensioned to contact a distal aspect of the first condyle. The second contact surface of the second pad may be dimensioned to contact a distal aspect of the second condyle.

In implementations, the first and second alignment arms may be dimensioned to extend past and overhang the first and second contact legs relative to the guide body.

In implementations, the first alignment arm may include first, second and third arm portions. The first arm portion may be translatable along an axis of a respective alignment passage of the guide body. The second arm portion may interconnect the first and third arm portions. The first and second arm portions may join to establish a generally L-shaped geometry. The second and third arm portions may join at a junction to establish a generally T-shaped geometry. A pair of the guide passages may extend through the third arm portion on opposite sides of the junction. The first alignment arm may include a protrusion that may extend inwardly from the third arm portion to establish the first engagement surface. The junction and the protrusion may be situated on opposite sides of the first guide passage. The second engagement surface of the paddle may have a substantially planar geometry.

A kit for an orthopaedic procedure of the present disclosure may include a guide body. A set of contact legs may differ in at least one dimension from each other and may be interchangeably securable to the guide body. Each of the contact legs may include a pad having a respective contact surface dimensioned to contact bone. A set of first alignment arms may differ in at least one dimension from each other and may be interchangeably securable to the guide body. Each of the first alignment arms may include a first engagement surface dimensioned to contact bone. A set of second alignment arms may each include a paddle having a second engagement surface. A geometry of the first engagement surface may differ from a geometry of the second engagement surface. A selected pair of the contact legs, a selected one of the second alignment arms, and a selected one of the set of alignment arms may be securable to the guide body to establish an assembly. The assembly may include a plurality of guide passages dimensioned to receive respective guide elements insertable in bone.

In implementations, the selected one of the first alignment arm and the selected one of the second alignment arms are dimensioned to extend past and overhang the selected pair of the contact legs relative to the guide body in an installed position.

In implementations, the first engagement surface may be dimensioned to contact an anterior aspect of a first condyle. The second engagement surface may be dimensioned to contact an anterior aspect of a second condyle. The contact surface of the pad may be dimensioned to contact a distal aspect of the first condyle or the second condyle.

A method of performing an orthopaedic procedure of the present disclosure may include configuring an alignment guide. The alignment guide may include a guide body, first and second alignment arms and first and second contact legs coupled to the guide body, and a plurality of guide passages. The first alignment arm may include a first engagement surface. The second alignment arm may include a paddle establishing a second engagement surface. A geometry of the first engagement surface may differ from a geometry of the second engagement surface. The first and second contact legs may include respective first and second pads. The configuring step may include setting a position of each of the first and second alignment arms and the first and second contact legs relative to the guide body based on positions of a set of anatomical landmarks. The method may include positioning the alignment guide relative to a bone according to the set positions such that the engagement surfaces of the first and second alignment arms and the first and second contact legs may establish contact with contact points along the bone that substantially correspond to the respective anatomical landmarks, and then inserting a plurality of guide elements through the respective guide passages and into the bone at insertion positions that may substantially correspond to respective insertion locations.

In implementations, the method may include determining the positions of the set of anatomical landmarks along an articular surface of a bone prior to the configuring step. The method may include determining the insertion locations prior to the configuring step.

In implementations, the configuring step may include independently adjusting the positions of the first and second alignment arms and the first and second contact legs relative to the guide body.

In implementations, the method may include determining the positions of the set of anatomical landmarks along an articular surface of a bone prior to the configuring step. The positioning step may include establishing contact between the first and second alignment arms and the first and second contact legs and the bone that may occur according to an order of the determining of the positions of the set of anatomical landmarks.

In implementations, the positioning step may occur such that the first and second alignment arms may extend past and overhang the first and second contact pads.

In implementations, the first alignment arm may extend past a terminal end of the paddle.

In implementations, the plurality of guide passages may include first and second guide passages that may extend through the first alignment arm. The positioning step may occur such that the first guide passage may be offset in a lateral-medial direction from the paddle relative to the bone and such that the second guide passage may be aligned in the lateral-medial direction with the paddle.

In implementations, the set of anatomical landmarks may be distributed along an articular surface that may extend along a distal femur.

In implementations, the set of anatomical landmarks may include an anterior aspect of a lateral condyle, an anterior aspect of a medial condyle, a distal aspect of the lateral condyle, and a distal aspect of the medial condyle.

In implementations, the first alignment arm may include a protrusion that may establish the first engagement surface. The positioning step may include moving the protrusion of the first alignment arm into contact with the anterior aspect of the lateral condyle, then moving the first pad into contact with the distal aspect of the lateral condyle, then moving the second pad into contact with the distal aspect of the medial condyle, and then moving the paddle of the second alignment arm into contact with the anterior aspect of the medial condyle.

In implementations, the configuring step may include selecting the first and second contact legs from a set of contact legs interchangeably mountable to the guide body. Two or more of the contact legs associated with the same respective anatomical landmark of the set of anatomical landmarks may differ in at least one dimension from each other. The configuring step may include selecting at least one of the first and second alignment arms from a set of alignment arms interchangeably mountable to the guide body. Two or more of the alignment arms associated with the same respective anatomical landmark of the set of anatomical landmarks may differ in at least one dimension from each other.

A transfer guide assembly for an orthopaedic procedure of the present disclosure may include a guide body. A plurality of guide passages may be dimensioned to receive respective guide elements insertable in bone. First and second alignment arms may be coupled to the guide body. The first alignment arm may include a first engagement surface. The second alignment arm may include a second engagement surface. A geometry of the first engagement surface may differ from a geometry of the second engagement surface. First and second contact legs may be coupled to the guide body. The first and second contact legs may include respective first and second contact surfaces. The first and second engagement surfaces and the first and second contact surfaces may be dimensioned to contact bone.

A method of performing an orthopaedic procedure of the present disclosure may include configuring an alignment guide. The alignment guide may include a guide body, first and second alignment arms and first and second contact legs coupled to the guide body, and a plurality of guide passages. The first alignment arm may include a first engagement surface. The second alignment arm may include a second engagement surface. A geometry of the first engagement surface may differ from a geometry of the second engagement surface. The configuring step may include setting a position of each of the first and second alignment arms and the first and second contact legs relative to the guide body based on positions of a set of anatomical landmarks. The method may include positioning the alignment guide relative to a bone according to the set positions such that the engagement surfaces of the first and second alignment arms and the first and second contact legs may establish contact with contact points along the bone that may substantially correspond to the respective anatomical landmarks, and then inserting a plurality of guide elements through the respective guide passages and into the bone at insertion positions that may substantially correspond to respective insertion locations.

FIG. 1 illustrates a surgical planning system 10 (hereinafter referred to as "the system 10"). The system 10 may be used for planning orthopaedic procedures, including pre-operatively, intra-operatively, and/or post-operatively to create, edit, review, refine, and/or execute surgical plans. The system 10 may be utilized for various orthopaedic and other surgical procedures, such as an arthroplasty to repair a joint.

Knee arthroplasty may be periodically referenced throughout this disclosure to illustrate or emphasize certain features of the system 10. However, the teachings of this disclosure are not intended to be limited to any particular joint of the human musculoskeletal system and should therefore be understood as being applicable to the knee, shoulder, hip, ankle, wrist, etc. Moreover, the teachings of this disclosure are not intended to be limited to arthroplasty procedures and are therefore applicable to the repair of fractures and/or other deformities within the scope of this disclosure.

The system 10 may include, among other things, at least one host computer 11, one or more client computers 12, one or more imaging devices 13, a cloud-based storage system 14, and a network 15. The system 10 may include a greater or fewer number of subsystems within the scope of this disclosure.

The host computer 11 may be configured to execute one or more software programs. In some implementations, the host computer 11 may be more than one computer jointly configured to process software instructions serially or in parallel.

The host computer 11 may be in communication with the network 15, which itself may include one or more computing devices. The network 15 may be a private local area network (LAN), a private wide area network (WAN), the Internet, or a mesh network, for example.

The host computer 11 and each client computer 12 may include one or more of a computer processor, memory, storage means, network device and input and/or output devices and/or interfaces. The input devices may include a keyboard, mouse, etc. The output devices may include a monitor, speakers, printers, etc. The memory may, for example, include UVPROM, EEPROM, FLASH, RAM, ROM, DVD, CD, a hard drive, or other computer readable medium that may store data and/or other information relating to the surgical planning and implementation techniques disclosed herein. The host computer 11 and each client computer 12 may be a desktop computer, laptop computer, smart phone, tablet, virtual machine, or any other computing device. The interfaces may facilitate communication with the other systems and/or components of the network 15.

Each client computer 12 may be configured to communicate with the host computer 11 either directly, such as via a direct client interface 16, or over the network 15. In other implementations, the client computers 12 may be configured to communicate with each other directly via a peer-to-peer interface 17.

Each client computer 12 may be coupled to one or more of the imaging devices 13. Each imaging device 13 may be configured to capture or acquire one or more images 18 of patient anatomy residing within a scan field (e.g., window) of the imaging device 13. The imaging device 13 may be configured to capture or acquire two dimensional (2D) and/or three dimensional (3D) greyscale and/or color images 18. Various imaging devices 13 may be utilized, including but not limited to an X-ray machine, a computerized tomography (CT) machine, or a magnetic resonance imaging (MRI) machine, for obtaining one or more images 18 of a patient.

The client computers 12 may also be configured to execute one or more software programs, such as those associated with various surgical planning tools. Each client computer 12 may be operable to access and locally and/or remotely execute a planning environment 19 for creating, editing, executing, refining, and/or reviewing one or more surgical plans 23 during pre-operative, intra-operative and/or post-operative phases of a surgery. The planning environment 19 may be a standalone software package or may be incorporated into another surgical tool. The planning environment 19 may be configured to communicate with the host computer 11 either over the network 15 or directly through the direct client interface 16.

The planning environment 19 may be further configured to interact with one or more of the imaging devices 13 to capture or acquire images 18 of patient anatomy. The planning environment 19 may provide a display or visualization of one or more images 18, anatomical (e.g., bone) models 20, implant models 21, transfer models 22, and/or surgical plans 23 via one or more graphical user interfaces (GUI). Each image 18, anatomical model 20, implant model 21, transfer model 22, surgical plan 23, and other data and/or information may be stored in one or more files or records according to a specified data structure.

The planning environment 19 may include various modules for performing the desired planning functions. For example, as further discussed below, the planning environment 19 may include a data module for accessing, retrieving, and/or storing data concerning the surgical plans 23, a display module for displaying the data (e.g., within one or more GUIs), a spatial module for modifying the data displayed by the display module, and a comparison module for determining one or more relationships between selected anatomical models and selected implant models. However, a greater or fewer number of modules may be utilized, and/or one or more of the modules may be combined to provide the disclosed functionality.

The storage system 14 may be operable to store or otherwise provide data from/to other computing devices, such as the host computer 11 and/or the one or more client computers 12, of the system 10. The storage system 14 may be a storage area network device (SAN) configured to communicate with the host computer 11 and/or the client computers 12 over the network 15. Although shown as a separate device of the system 10, the storage system 14 may in some implementations be incorporated within or directly coupled to the host computer 11 and/or client computers 12. The storage system 14 may be configured to store one or more of computer software instructions, data, database files, configuration information, etc.

In some implementations, the system 10 may be a client-server architecture configured to execute computer software on the host computer 11, which may be accessible by the client computers 12 using either a thin client application or a web browser that can be executed on the client computers 12. The host computer 11 may load the computer software instructions from local storage, or from the storage system 14, into memory and may execute the computer software using the one or more computer processors.

The system 10 may further include one or more databases 24. The databases 24 may be stored at a central location, such as on the storage system 14. In another implementation, one or more databases 24 may be stored at the host computer 11 and/or may be a distributed database provided by one or more of the client computers 12. Each database 24 may be a relational database configured to associate one or more images 18, anatomical models 20, implant models 21, and/or transfer models 22 to each other and/or to a respective surgical plan 23. Each surgical plan 23 may be associated with the anatomy of a respective patient. Each image 18, anatomical model 20, implant model 21, transfer model 22, and surgical plan 23 may be assigned a unique identifier or database entry for storage on the storage system 14. Each database 24 may be configured to store data and other information corresponding to the images 18, anatomical models 20, implant models 21, transfer models 22, and surgical plans 23 in one or more database records or entries, and/or may be configured to link or otherwise associate one or more files corresponding to each respective image 18, anatomical model 20, implant model 21, transfer model 22, and surgical plan 23. The various data stored in the database(s) 24 may correspond to respective patient anatomies from prior surgical cases, and may be arranged into one or more predefined categories such as sex, age, ethnicity, defect category, procedure type, anatomical makeup classification, surgeon, facility or organization, etc.

Each image 18 and anatomical model 20 may include data and other information obtained from one or more medical devices or tools, such as the imaging devices 13. The anatomical models 20 may include one or more digital images and/or coordinate information relating to an anatomy of the patient obtained or derived from image(s) 18 captured or otherwise obtained by the imaging device(s) 13. Each anatomical model 20 may be representative of one or more bones, joints and/or other tissue of the patient anatomy.

Each implant model 21 and transfer model 22 may include coordinate information associated with a predefined design or a design established or modified by the planning environment 19. The predefined design may correspond to one or more components. The planning environment 19 may incorporate and/or interface with one or more modeling packages, such as a computer aided design (CAD) package, to render the models 20, 21, and 22 as two-dimensional (2D) and/or three-dimensional (3D) volumes or constructs, which may overlay one or more of the images 18 in a display screen of a GUI.

The implant models 21 may correspond to implants and components of various shapes and sizes. Each implant may include one or more components that may be situated at a surgical site including screws, anchors, grafts, etc. Each implant model 21 may correspond to a single component or may include two or more components that may be configured to establish an assembly. Each implant and associated component(s) may be formed of various materials, including metallic and/or non-metallic materials. Each anatomical model 20, implant model 21, and transfer model 22 may correspond to 2D and/or 3D geometry, and may be utilized to generate a wireframe, mesh, and/or solid construct in a GUI.

Each surgical plan 23 may be associated with one or more of the images 18, anatomical models 20, implant models 21, and/or transfer models 22. The surgical plan 23 may include various parameters associated with the images 18, anatomical models 20, implant models 21, and/or transfer models 22. The surgical plan 23 may include parameters including spatial information relating to relative positioning and coordinate information of the selected anatomical model(s) 20, implant model(s) 21, and/or transfer model(s) 22.

The surgical plan 23 may define one or more revisions to an anatomical model 20 and information relating to a position of an implant model 21 and/or transfer model 22 relative to the original and/or revised anatomical model 20. The surgical plan 23 may include coordinate information relating to the revised anatomical model 20 and a relative position of the implant model 21 and/or transfer model 22 in one or more predefined data structure(s). The planning environment 19 may be configured to implement one or more revisions to the various models, either automatically or in response to user interaction with the user interface(s). Revisions to each anatomical model 20, implant model 21, transfer model 22, and/or surgical plan 23 may be stored in one or more of the databases 24, either automatically and/or in response to user interaction with the system 10.

One or more surgeons and/or other staff users may be presented with the planning environment 19 via the client computers 12 and may simultaneously access each image 18, anatomical model 20, implant model 21, transfer model 22, and surgical plan 23 stored in the database(s) 24. Each user may interact with the planning environment 19 to create, view, refine, and/or modify various aspects of the surgical plan 23. Each client computer 12 may be configured to store local instances of the images 18, anatomical models 20, implant models 21, transfer models 22, and/or surgical plans 23, which may be synchronized in real-time or periodically with the database(s) 24. The planning environment 19 may be a standalone software package executed on a client computer 12 or may be provided as one or more web-based services executed on the host computer 11.

The system 10 described above may be configured for preoperatively planning surgical procedures. The preoperative planning provided by the system 10 may include, but is not limited to, features such as constructing a virtual model of an anatomy of the patient, identifying landmarks within the virtual model, selecting and orienting virtual implants within the virtual model, specifying a configuration of a virtual transfer guide within the virtual model, etc.

Figure 2:
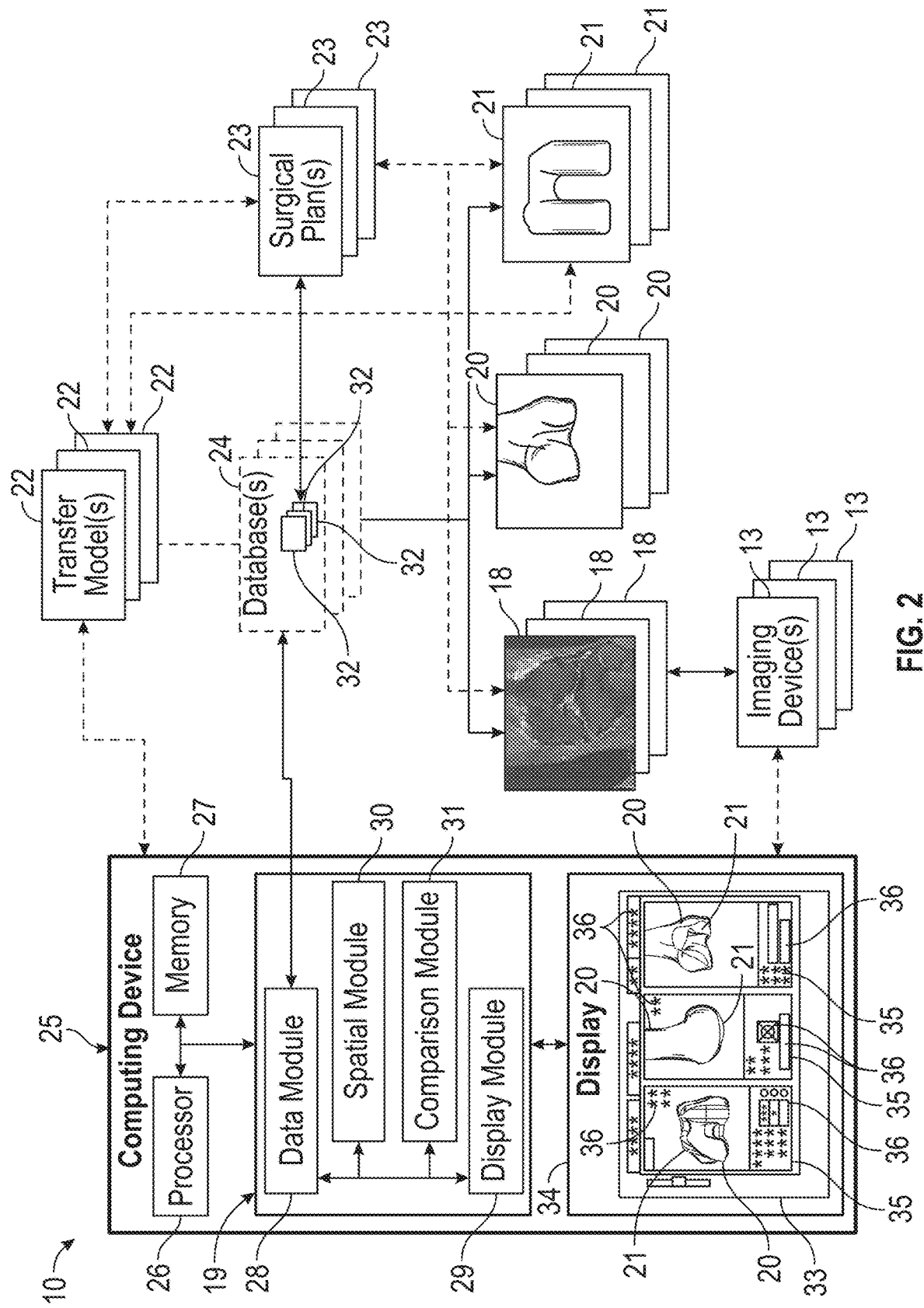
FIG. 2 schematically illustrates exemplary aspects of the surgical planning system of FIG. 1.

Referring now to FIG. 2, with continuing reference to FIG. 1, the system 10 may include a computing device 25 including at least one processor 26 coupled to a memory 27 configured to store computer executable instructions. The computing device 25 may be considered representative of any of the computing devices disclosed herein, including but not limited to the host computer 11 and/or the client computers 12. The processor 26 may be configured to execute one or more of the planning environments 19 for creating, editing, executing, refining, and/or reviewing one or more surgical plans 23 and any associated anatomical models 20, implant models 21, and transfer models 22 during pre-operative, intra-operative, and/or post-operative phases of a surgery.

The processor 26 can be a custom made or commercially available processor, central processing unit (CPU), or generally any device for executing software instructions. The memory 27 can include any one or combination of volatile memory elements and/or nonvolatile memory elements. The processor 26 may be operably coupled to the memory 27 and may be configured to execute one or more programs stored in the memory 27 based on various inputs received from other devices or data sources.

The planning environment 19 may include at least a data module 28, a display module 29, a spatial module 30, and a comparison module 31. Although four modules are shown, it should be understood that a greater or fewer number of modules could be utilized, and/or further that one or more of the modules could be combined to provide the disclosed functionality.

The data module 28 may be configured to access, retrieve, and/or store data and other information in the database(s) 24 corresponding to one or more images 18 of patient anatomy, anatomical model(s) 20, implant model(s) 21, transfer model(s) 22, and/or surgical plan(s) 23. The data and other information may be stored in one or more databases 24 as one or more records or entries 32. In some implementations, the data and other information may be stored in one or more files that are accessible by referencing one or more objects or memory locations referenced by the entries 32.

The memory 27 may be configured to access, load, edit, and/or store instances of one or more images 18, anatomical models 20, implant models 21, transfer models 22, and/or surgical plans 23 in response to one or more commands from the data module 28. The data module 28 may be configured to cause the memory 27 to store a local instance of the image(s) 18, anatomical model(s) 20, implant model(s) 21, transfer model(s) 22, and/or surgical plan(s) 23, which may be synchronized with the entries 32 stored in the database(s) 24.

The data module 28 may be configured to receive data and other information corresponding to at least one or more images 18 of patient anatomy from various sources, such as the imaging device(s) 13. The data module 28 may be further configured to command the imaging device 13 to capture or acquire the images 18 automatically or in response to user interaction.

The display module 29 may be configured to display data and other information relating to one or more surgical plans 23 in at least one graphical user interface (GUI) 33, including one or more of the images 18, anatomical models 20, implant models 21, and/or transfer models 22. The computing device 25 may incorporate or be coupled to a display device 34. The display module 29 may be configured to cause the display device 34 to display information in the user interface 33. A surgeon or other user may interact with the user interface 33 within the planning environment 19 to view one or more images 18 of patient anatomy and/or any associated anatomical models 20, implant models 21, and transfer models 22. The surgeon or other user may interact with the user interface 33 via the planning environment 19 to create, edit, execute, refine, and/or review one or more surgical plans 23.

The user interface 33 may include one or more display windows 35 and one or more objects 36 that may be presented within the display windows 35. The display windows 35 may include any number of windows, and the objects 36 may include any number of objects within the scope of this disclosure.

A surgeon or user may interact with the user interface 33, including the objects 36 and/or display windows 35, to retrieve, view, edit, store, etc., various aspects of a respective surgical plan 23, which may include information from the selected image(s) 18, anatomical model(s) 20, implant model(s) 21 and/or transfer model(s) 22. The objects 36 may include graphics such as menus, tabs, buttons, drop-down lists, directional indicators, etc. The objects 36 may be organized in one or more menu items associated with the respective display windows 35. Geometric objects, including selected image(s) 18, anatomical model(s) 20, implant model(s) 21, transfer model(s) 22, and/or other information relating to the surgical plan 23, may be displayed in one or more of the display windows 35. Each transfer model 22 may include one or more surgical instruments used to, modify the anatomy, implant a selected implant, or otherwise treat the patient as part of the surgical plan 23.

The surgeon may interact with the objects 36 to specify various aspects of the surgical plan 23. For example, the surgeon may select one of the tabs to view or specify aspects of the surgical plan 23 for one portion of a joint, such as a femur, and may select another one of the tabs to view or specify aspects of the surgical plan 23 for another portion of the joint, such as a tibia. The surgeon make further take various measurements (e.g., linear, angular, tissue density, etc.) of the joint as part specifying aspects of the surgical plan 23.

The surgeon may interact with the menu items to select and specify various aspects of the anatomical models 20, implant models 21, and/or transfer models 22 from the database 24. In implementations, the display module 29 may be configured to display one or more anatomical models 20 together with the respective image(s) 18 of the patient anatomy and implant models 21 selected in response to user interaction with the user interface 33. The user may interact with the drop-down lists of the objects 36 within the display windows 35 to specify implant type, size, position and orientation, resection angles and planes, etc.

The user may interact with various buttons to change (e.g., increase or decrease) a resection angle and/or position of an associated resection plane. The user may interact with buttons adjacent the selected implant model 21 to change (e.g., increase or decrease) a size of a component of the selected implant model 21. The buttons may be overlaid onto or may be situated adjacent to the display windows 35.

The user may further interact with directional indicators to move a portion of the selected implant model 21 in different directions (e.g., up, down, left, right) in one of the display windows 35. The surgeon may drag or otherwise move the selected implant model 21 to a desired position in the display window 35 utilizing a mouse or other input device, for example. The surgeon may interact with one of the drop-down lists to specify a type and/or size of a component of the selected implant model 21.

The display module 29 may be configured to superimpose one or more of the anatomical models 20, the implant models 21, and the transfer models 22 over one or more of the images 18 within one or more of the display windows 35. The implant model 21 may include one or more components that establish an assembly. At least a portion of the implant model 21 may be configured to be at least partially received in a volume of a selected one of the anatomical models 20. In some implementations, the implant model 21 may have an articulation surface dimensioned to mate with an articular surface of an opposed bone or implant.

The display windows 35 may be configured to display the images 18, anatomical models 20, implant models 21, and/or transfer models 22 at various orientations. The display module 29 may be configured to display two dimensional (2D) representation(s) of the selected anatomical model(s) 20, implant model(s) 21, and/or transfer model(s) 22 in the some of the display windows 35, and may be configured to display 3D representation(s) of the selected anatomical model 20, implant model 21, and/or transfer model(s) 22 in another of the display windows 35, for example. The surgeon may interact with the user interface 33 to move (e.g., up, down, left, right, rotate, etc.) the selected anatomical model 20, selected implant model 21, and/or selected transfer model 22 in 2D space and/or 3D space. Other implementations for displaying 2D and/or 3D representations in the various display windows 35 are further contemplated within the scope of this disclosure.

The display module 29 may be further configured such that the selected image(s) 18, anatomical model(s) 20, implant model(s) 21, and/or transfer model(s) 22 may be selectively displayed and hidden (e.g., toggled) in one or more of the display windows 35 in response to user interaction with the user interface 33, which may provide the surgeon with enhanced flexibility in reviewing aspects of the surgical plan 23. For example, the surgeon may interact with drop-down lists of the objects 36 to selectively display and hide components of the selected implant model 21 in one of the display windows 35.

The selected anatomical model 20 may correspond to one or more bones associated with a joint, including any of the exemplary joints disclosed herein. The display module 29 may be configured to display a sectional view of the selected anatomical model 20 and selected implant model 21 in one or more of the display windows 35, for example. The sectional view of the anatomical model(s) 20 may be presented or displayed together with the associated image(s) 18 of the patient anatomy.

The spatial module 30 may be configured to establish one or more resection planes along the selected anatomical model 20. A volume of the selected implant model 21 may be at least partially received in a volume of the selected anatomical model 20 along the resection plane(s). The resection plane(s) may be defined by a resection angle.

The spatial module 30 may be further configured to cause the display module 29 to display an excised portion of the selected anatomical model 20 to be displayed in one of the display windows 35 in a different manner than a remainder of the anatomical model 20 on an opposed side of the resection plane. For example, the excised portion of the anatomical model 20 may be hidden from display in the display window 35 such that the respective portion of the 18 of the patient anatomy is shown. In other implementations, the excised portion of the selected anatomical model 20 may be displayed in a relatively darker shade. The spatial module 30 may determine the excised portion by comparing coordinates of the anatomical model 20 with respect to a position of the resection plane, for example. The user may interact with one or more buttons of the objects 36 to toggle between a volume of previous and revised (e.g., resected) states of the selected anatomical model 20.

The planning environment 19 may be further configured such that changes in one of the display windows 35 are synchronized with each of the other windows 35. The changes may be synchronized between the display windows 35 automatically and/or manually in response to user interaction.

The surgeon may utilize various instrumentation and devices to implement each surgical plan 23, including preparing the surgical site and securing one or more implants to bone or other tissue to restore functionality to the respective joint. Each of the transfer models 22 may be associated with a respective surgical instrument or device (e.g., transfer guides, etc.) or a respective implant model 21.

The surgical plan 23 may be associated with one or more positioning objects such as a guide element (e.g., pin, guide wire, or Kirschner wire) dimensioned to be secured in tissue to position and orient the various instrumentation, devices and/or implants. The display module 29 may be configured to display a virtual position and virtual axis in one or more of the display windows 35. The virtual position may be associated with a specified position of the positioning object relative to the patient anatomy (as represented by the image(s) 18). The virtual axis may extend through the virtual position and may be associated with a specified orientation of the positioning object relative to the patient anatomy. The spatial module 30 may be configured to set the virtual position and/or virtual axis in response to placement of a respective implant model 21 relative to the anatomical model 20 and associated patient anatomy. The virtual position and/or virtual axis may be set and/or adjusted automatically based on a position and orientation of the selected implant model 21 relative to the selected anatomical model 20 and/or in response to user interaction with the user interface 33.

The spatial module 30 may be further configured to determine one or more collision or contact points associated with the patient anatomy. The contact points may be associated with one or more landmarks or other surface features along the anatomical model 20 and/or other portions of the patient anatomy. Each contact point may be established along an articular surface or non-articular surface of a joint. The spatial module 30 may be configured to set the contact points based on the virtual position, virtual axis, and/or position and orientation of the respective implant model 21 relative to the patient anatomy. The spatial module 30 may be configured to cause the display module 29 to display the contact points in one or more of the display windows 35. In some implementations, the contact points may be set and/or adjusted automatically based on a position of the implant model 21 and/or in response to user interaction with the user interface 33. The virtual position, virtual axis, and/or contact points may be stored in one or more entries 32 in the database 24 and may be associated with the respective surgical plan 23.

The comparison module 31 may be configured to generate or set one or more parameters associated with implementing the surgical plan 23. The parameters may include one or more settings or dimensions associated with the respective transfer models 22. The parameters may be based on the virtual position, virtual axis, and/or contact points. The comparison module 31 may be configured to determine one or more settings or dimensions associated with the respective transfer models 22 relative to the patient anatomy, anatomical model(s) 20, implant model(s) 21, virtual position, virtual axis, and/or contact points. The dimensions and settings may be utilized to form and/or configure a physical instance of each respective transfer model 22. The settings may be utilized to specify a position and orientation of each respective transfer model 22 relative to the implant model 21 and/or anatomical model 20. The settings may be utilized to configure one or more transfer members (e.g., objects) and related instrumentation or devices associated with the transfer model 22. The comparison module 31 may be configured to generate the settings and/or dimensions such that the transfer model 22 contacts one or more predetermined positions at or along the anatomical model 20 or patient anatomy in an installed position when coupled to the respective implant model 21. The predetermined positions may include one or more of the contact points. The settings and dimensions may be communicated utilizing various techniques, including one or more graphics in the user interface 33 or output files. The settings and/or dimensions may be stored in one or more entries 32 in the database 24 associated with the transfer models 22.

The user may interact with a list of the objects 36 associated with one of the display windows 35 to select a desired transfer model 22 from the database 24. The display module 29 may be configured to display the selected transfer model 22 in the display windows 35 at various positions and orientations. The spatial module 30 may be configured to set an initial position of the selected transfer model 22 according to the virtual position, virtual axis, and/or contact points.

The user may interact with the user interface 33 to set or adjust a position and/or orientation of the selected transfer model 22. The user may interact with directional indicators of the objects 36 to move the selected transfer model 22 and/or virtual position in different directions (e.g., up, down, left, right) in the display windows 35. The surgeon may drag or otherwise move the selected transfer model 22 and/or virtual position to a desired position in the display windows 35 utilizing a mouse or other input device, for example. The user may interact with rotational indicators of the objects to adjust a position and/or orientation of the transfer model 22 about the virtual axis relative to the selected anatomical model 20 and/or implant model 21. The user may interact with tilt indicators of the objects 36 to adjust an orientation of the selected transfer model 22 and associated virtual axis at the virtual position relative to the selected anatomical model 20 and/or implant model 21. The user may interact with other buttons and/or directional indicators to cause the transfer model 22 to articulate or otherwise move. The transfer model 22 may be articulated or otherwise moved independently or synchronously, which may occur manually in response to user interaction and/or automatically in response to situating the transfer model 22 relative to the anatomical model 20 and/or implant model 21. Movement of the transfer model 22 may cause an automatic adjustment to the respective contact points.

Various transfer members may be utilized with the planning environment 19 to implement the surgical plan(s) 23. Each transfer member may be associated with a respective transfer model 22. The transfer members may be incorporated into transfer guides, implants, and/or assemblies to set a position and orientation of the respective implant prior to fixing or otherwise securing the implant at a surgical site.

Figure 3:
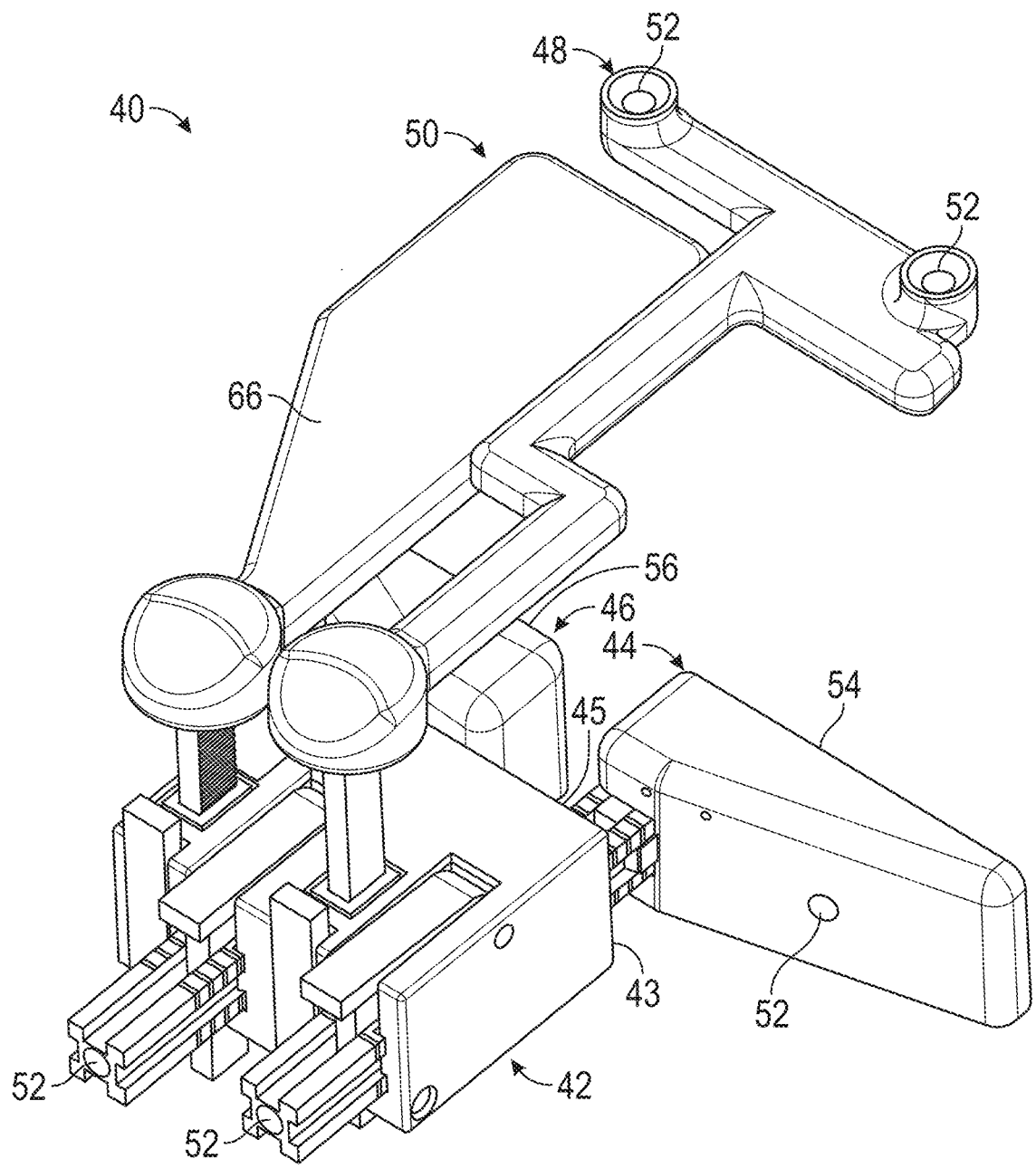
FIG. 3 illustrates a perspective view of a transfer guide assembly.

FIG. 3 illustrates a transfer guide assembly 40 according to an implementation. The assembly 40 may utilized for various surgical procedures, including orthopedic procedures to treat one or more defects or deformities. The assembly 40 may be utilized to treat various bones and joints, including long bones such as a distal femur and/or proximal tibia during a knee arthroplasty, and bones and joint surfaces associated with other joints such as the ankle, hip and shoulder. The assembly 40 may be utilized in total knee arthroplasty (TKA) to restore functionality to a knee joint. The system 10 may be utilized to establish a transfer model 22 for the assembly 40. The transfer model 22 may include a geometry of the various components of the assembly 40. The system 10 may be configured to establish a respective transfer model 22 for the assembly 40.

Figure 4:
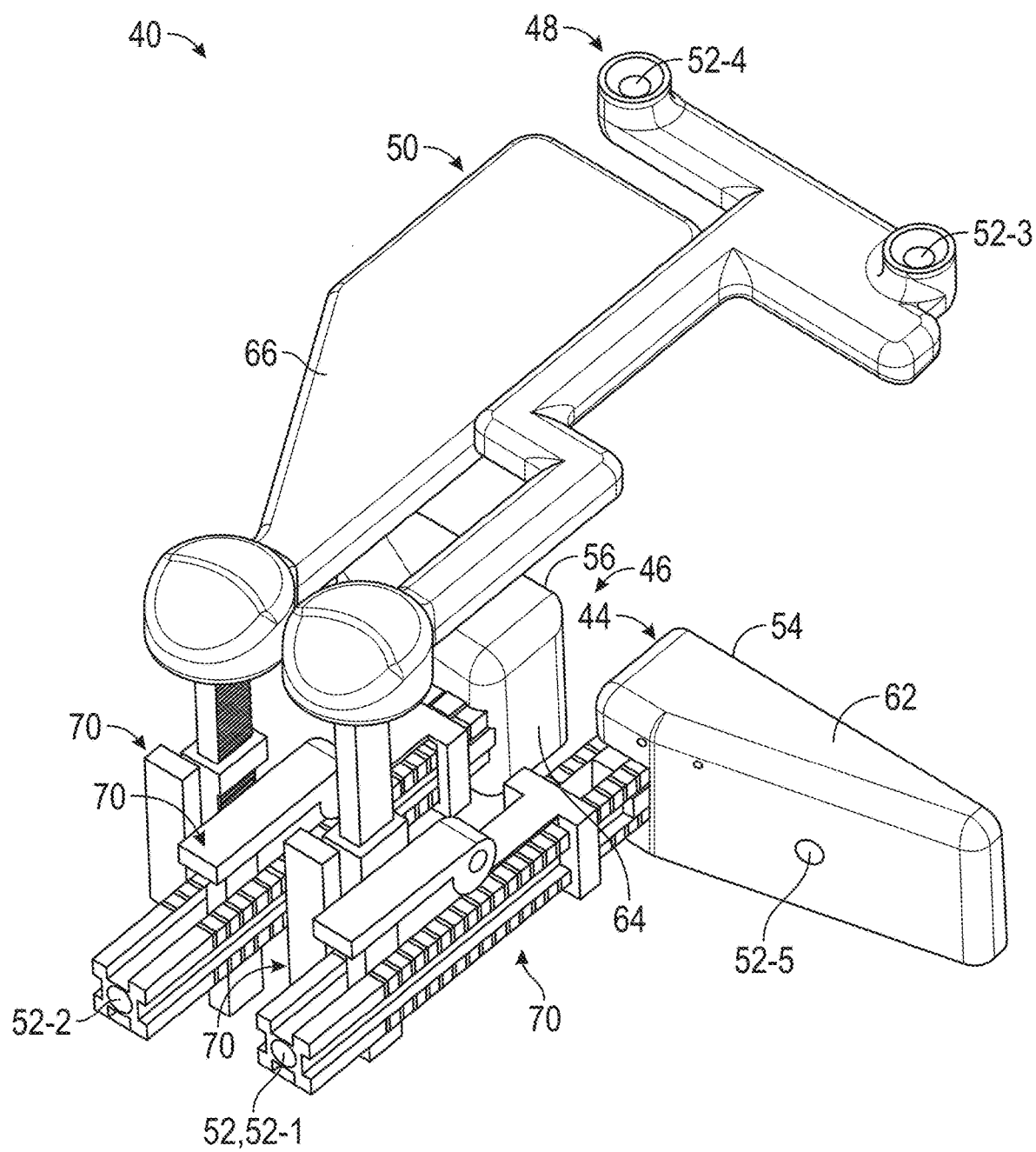
FIG. 4 illustrates the assembly of FIG. 3 with a guide body omitted.

The assembly 40 may include a guide body 42 (omitted from FIG. 4). The guide body 42 may have a generally cuboid geometry, although other geometries may be utilized. The guide body 42 may include a first (e.g., bone face) sidewall 43 and a second sidewall 45. The first and second sidewalls 43, 45 may be joined with one another. In implementations, the first sidewall 43 may be orthogonal or otherwise transverse to the second sidewall 45. The assembly 40 may include a first contact leg 44, a second contact leg 46, a first alignment arm 48 and a second alignment arm 50 coupled to the guide body 42. The contact legs 44, 46 may extend outwardly from the first sidewall 43 of the guide body 42. The alignment arms 48, 50 may extend outwardly from the second sidewall 45 of the guide body 42. The contact legs 44, 46 and alignment arms 48, 50 may be associated with respective transfer members of the transfer model 22.

The assembly 40 may be utilized to position one or more surgical devices, such as one or more guide elements, relative to an anatomy of a patient. The guide elements may be insertable in bone and may include any of the guide elements disclosed herein, such as pins, K-wires, etc. Other surgical devices may include drills, burrs, saw blades, etc. The assembly 40 may include one or more guide passages 52. Each of the guide passages 52 may be dimensioned to receive a respective guide element. The guide element may be insertable in bone or other tissue (see, e.g., guide elements GE of FIG. 28). The guide passages 52 may have various geometries. The guide passage 52 may be a hole extending through the respective component or may be a slot or notch extending along a periphery of the component.

Referring to FIG. 4, with continuing reference to FIGS. 1-3, the guide passages 52 may include first through fourth guide passages 52-1 to 52-4. The assembly 40 may include fewer or more than four total guide passages 52, such as only one guide passage 52. In implementations, the guide passages 52 may include fifth and sixth guide passages 52-5, 52-6 (see, e.g., FIG. 7).

The assembly 40 may be configured to establish a position and/or orientation of the guide body 42 and/or guide passages 52 relative to bone or other tissue. The assembly 40 may be configured prior to, during and/or subsequent to establishing contact with the anatomy. The assembly 40 may be configured pre-operatively and/or inter-operatively according to a surgical plan 23 associated with an anatomy of a patient. The assembly 40 may be configured to establish a position and/or orientation of one or more guide elements and/or other surgical devices according to one or more parameters specified in the surgical plan 23.

Figure 5:
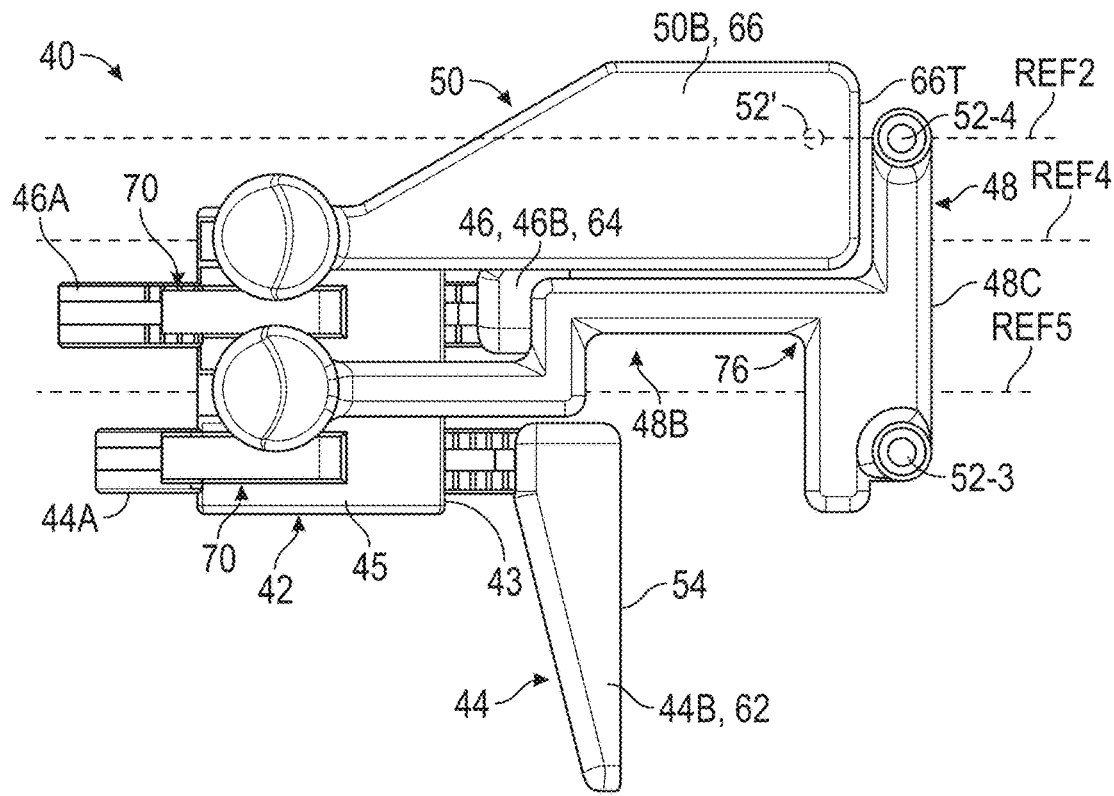
FIG. 5 illustrates a side (e.g., top) view of the assembly of FIG. 3.
Figure 6:
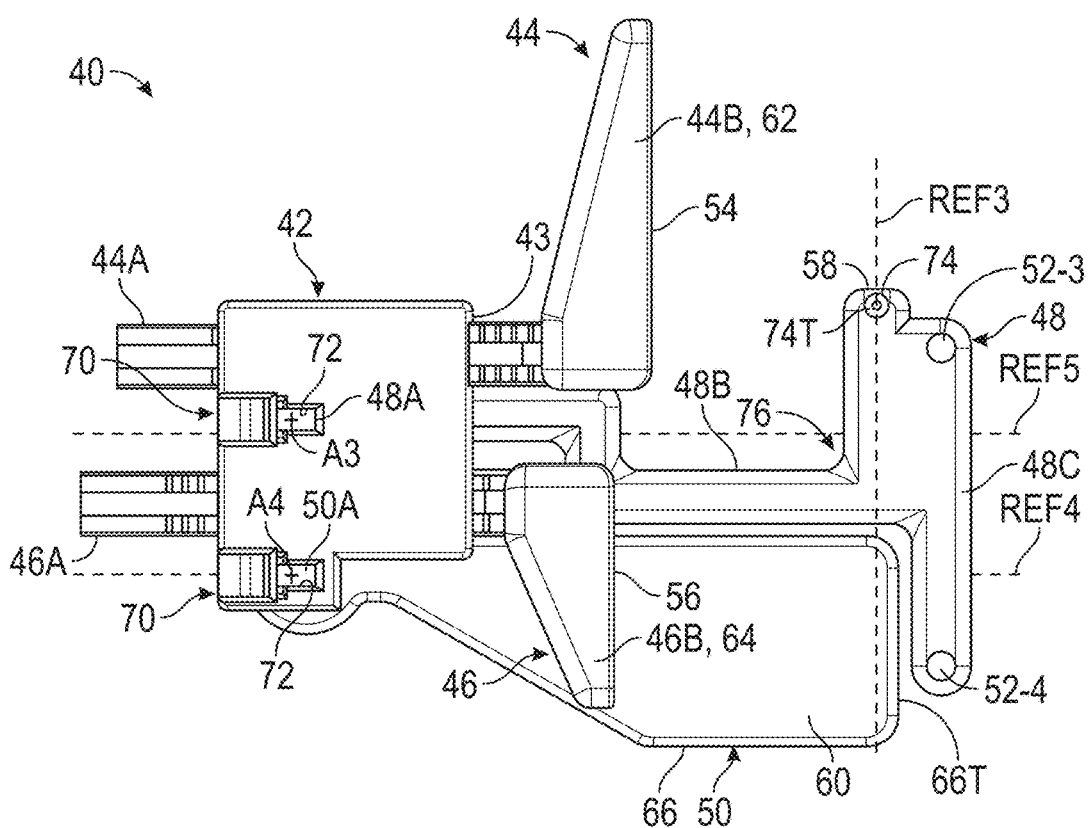
FIG. 6 illustrates another side (e.g., bottom) view of the assembly of FIG. 3.

Referring to FIGS. 4-6, with continuing reference to FIG. 3, the assembly 40 may include one or more contact (e.g., engagement) points dimensioned to contact bone or other tissue. In implementations, the assembly 40 may include at least four separate and distinct contact points to position the assembly 40 relative to the patient anatomy, although fewer or more than four contact points may be utilized. The number of contact points may be selected based on a complexity of the associated anatomy to be treated by the assembly 40. Each of the contact legs 44, 46 and alignment arms 48, 50 may include respective contact (e.g., engagement) surfaces dimensioned to contact bone or other tissue. The first contact leg 44 may include a first contact surface 54. The second contact leg 46 may include a second contact surface 56. The first alignment arm 48 may include a first engagement surface 58, and the second alignment arm 50 may include a second engagement surface 60 (FIG. 6). A geometry of the surfaces 54, 56, 58 and 60 may be the same or may differ from each other. The contact surfaces 54, 56 and/or engagement surfaces 58, 60 may be dimensioned to contact bone or other tissue of the patient. The contact surfaces 54, 56 and/or engagement surfaces 58, 60 may be dimensioned to establish contact at respective positions along a common bone, such as articular and/or non-articular surfaces of a distal femur or another long bone. In implementations, the assembly 40 may be dimensioned such that the contact surfaces 54, 56 and engagement surfaces 58, 60 may establish contact with adjacent bones of a joint, such as a femur and tibia of a knee joint.

The contact surfaces 54, 56 and/or engagement surfaces 58, 60 may have various geometries to establish contact with respective positions along the patient anatomy. The contact surfaces 54, 56 and/or engagement surfaces 58, 60 may have a substantially planar geometry. In other implementations, the contact surfaces 54, 56 and/or engagement surfaces 58, 60 may have a non-planar or complex geometry. In implementations, at least one or each of the contact surfaces 54, 56 and/or engagement surfaces 58, 60 may have a patient-specific surface that may substantially conform to an articular and/or non-articular surface contour of a bone. For the purposes of this disclosure, the term "substantially" means±5% of the stated value or relationship.

Figure 7:
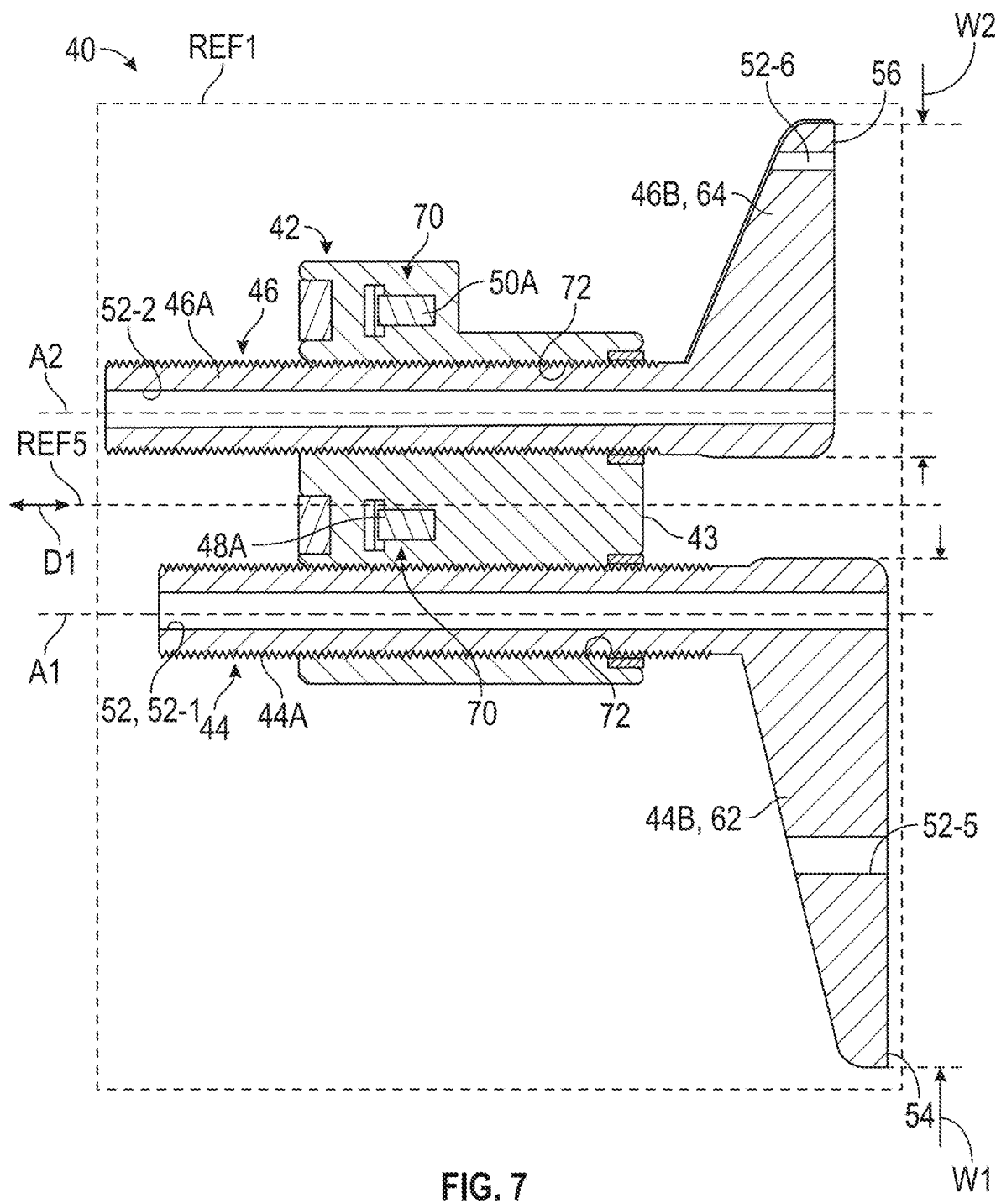
FIG. 7 illustrates a sectional view of the assembly taken along line 7-7 of FIG. 8.

The first contact leg 44 may include a first pad 62. The first pad 62 may establish the first contact surface 54. The second contact leg 46 may include a second pad 64. The second pad 64 may establish the second contact surface 56. A geometry of the first and second pads 62, 64 may be the same or may differ from each other. In the implementation of FIG. 7, the first pad 62 may establish a first width W1 and the second pad 64 may establish a second width W2 across the respective contact surfaces 54, 56. The first and second widths W1, W2 may be the same or may differ. The first width W1 may be greater than the second width W2. In other implementations, the first width W1 may be less than or equal to the second width W2. FIG. 7 omits the alignment arms 48, 50 of the assembly 40.

A geometry of the engagement surfaces 58, 60 of the alignment arms 48, 50 may be the same or may differ from each other. In implementations, the second alignment arm 50 may include a paddle 66. The paddle 66 may establish the second engagement surface 60 (FIG. 6). The paddle 66 may be dimensioned such that a geometry of the first engagement surface 58 may be the same or may differ from a geometry of the second engagement surface 60. The engagement surface 60 established by the paddle 66 may have a substantially planar geometry. The paddle 66 may be dimensioned to accommodate variance in width of anatomies, such as femurs or other long bones of various shapes and sizes of patients. In implementations, the first engagement surface 58 of the first alignment arm 48 may be dimensioned to contact an anterior aspect of a first condyle of a bone, and the second engagement surface 60 of the second alignment arm 50 may be dimensioned to contact an anterior aspect of a second condyle of a bone. The first contact surface 54 of the first pad 62 may be dimensioned to contact a distal aspect of the first condyle. The second contact surface 56 of the second pad 64 may be dimensioned to contact a distal aspect of the second condyle. The first condyle may be a lateral condyle and the second condyle may be a medial condyle of a bone, or vice versa. The first and second condyles may establish articular surfaces of a joint, such as articular surfaces of a distal femur of a knee joint. The assembly 40 may be dimensioned such that the pads 62, 64 may engage the first and second condyles when the knee joint is oriented with at least 10 or 45 degrees of flexion.

Figure 33:
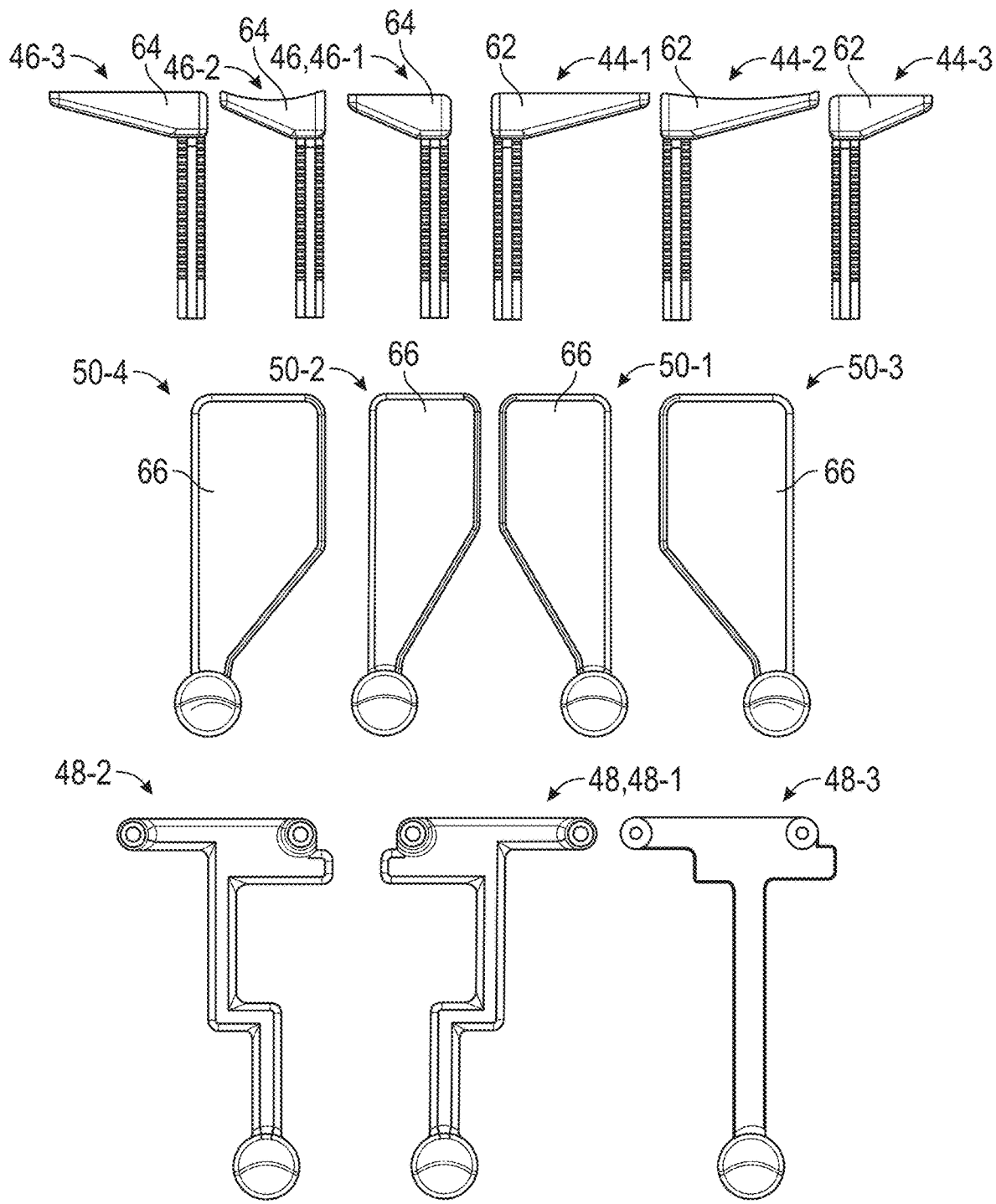
FIG. 33 illustrates a kit including sets of contact legs and alignment arms that may be utilized with the assembly of FIG. 3.

The contact legs 44, 46 and/or alignment arms 48, 50 may be releasably secured to the guide body 42. In implementations, the first and/or second contact legs 44, 46 may be interchangeable with a set of contact legs, which may differ in at least one dimension from each other. The first and/or second alignment arms 48, 50 may be interchangeable with a set of alignment arms, which may differ in at least one dimension from each other. The sets of contact legs and alignment arms may be provided to the surgeon as a kit (see, e.g., FIG. 33). The set of contact legs may include contact legs dimensioned as a mirror image of the respective first and/or second contact legs 44, 46. The set of alignment arms may include alignment arms dimensioned as a mirror image of the respective first and/or second alignment arms 48, 50. The sets of contact legs and alignment arms may be utilized to treat different anatomies.

In implementations, the kit may include a guide body 42, at least one set of contact legs and/or at least one set of alignment arms. The set(s) of contact legs and the set(s) of alignment arms may include any of the contact legs and alignment arms disclosed herein. Each set of contact legs may include two or more contact legs that may differ in at least one dimension from each other (e.g., width, length, area, surface contour, etc.) and that may be interchangeably securable to the guide body 42. The contact legs may include a first set of contact legs (e.g., contact legs 44-1 to 44-3) and/or a second set of contact legs (e.g., contact legs 46-1 to 46-3). In implementations, the contact legs 44-1 to 44-3 and 46-1 to 46-3 may be provided together in a set of contact legs. Each of the contact legs 44/46 of the set of contact legs may include a pad 62/64 having a respective contact surface dimensioned to contact bone. Each set of alignment arms may include two or more alignment arms that may differ in at least one dimension from each other (e.g., width, length, area, etc.) and may be interchangeably securable to the guide body 42. The alignment arms may include a set of first alignment arms 48 (e.g., alignment arms 48-1 to 48-3) and/or a set of second alignment arms 50 (e.g., alignment arms 50-1 to 50-4). In implementations, the first alignment arms 48-1 to 48-3 and second alignment arms 50-1 to 50-4 may be provided together in a set of alignment arms. Each of the alignment arms 48 may including a first engagement surface dimensioned to contact bone. Each of the alignment arms 50 may include a paddle 66 having a second engagement surface. The paddles 66 of two or more of the alignment arms 50 may differ in at least one dimension (e.g., width, length, area, surface contour, etc.). A geometry of the first engagement surface of the alignment arm 48 may differ from a geometry of the second engagement surface of the alignment arm 50 (e.g., width, length, area, surface contour, etc.). A selected pair of the contact legs 44, 46, a selected one of the first alignment arms 48, and a selected one of the second alignment arms 50 may be securable to the guide body 42 to establish an assembly. The assembly may include a plurality of guide passages 52 (e.g., FIGS. 3-4) dimensioned to receive respective guide elements insertable in bone.

Various techniques may be utilized to adjust a position of the contact legs 44, 46 and/or alignment arms 48, 50 relative to the guide body 42. In implementations, the contact legs 44, 46 and/or alignment arms 48, 50 may be independently adjustable relative to the guide body 42 in response to actuating a respective lock mechanism 70. Each lock mechanism 70 may be configured to set a position of the respective one of the contact legs 44, 46 and/or alignment arms 48, 50. The set position may be established according to one or more parameters of a surgical plan 23 (FIGS. 1-2). The lock mechanisms 70 of the respective contact legs 44, 46 and alignment arms 48, 50 may be the same or may differ in construction. In implementations, the lock mechanism 70 may establish a rachet. Other techniques for securing the contact legs 44, 46 to the guide body 42 may be utilized within the scope of this disclosure, such as a hinge connection.

The contact legs 44, 46 may include various geometries adapted to establish contact with a portion of bone or other tissue. The first contact leg 44 may include a first leg portion 44A and second leg portion 44B. The second contact leg 46 may include a first leg portion 46A and second leg portion 46B.

Referring to FIG. 7, with continuing reference to FIGS. 4-6, the first leg portion 44A/46A may be joined with the second leg portion 44B/46B to establish a generally L-shaped geometry. The guide body 42 may include one or more interface passages 72. The first leg portions 44A, 46A of the contact legs 44, 46 may be dimensioned to be at least partially received along the respective interface passages 72. The first leg portions 44A, 46A of the respective contact legs 44, 46 may extend outwardly from the first sidewall 43 of the guide body 42.

The first leg portions 44A, 46A may be translatable along axes A1, A2 of the respective interface passages 72 of the guide body 42 to establish a position of the contact surfaces 54, 56 relative to the guide body 42. The axes A1, A2 may be substantially parallel or transverse to each other. The first and second guide passages 52-1, 52-2 may extend through the first leg portions 44A, 46A of the respective contact legs 44, 46. The first leg portions 44A, 46A may be dimensioned such that the first and second guide passages 52-1, 52-2 may extend along the respective axes A1, A2 of the interface passages 72 of the guide body 42. The first and/or second contact legs 44, 46 may be independently moveable along a first reference plane REF1 relative to the guide body 42. In implementations, the first axis A1 and/or second axis A2 may extend along the first reference plane REF1.

The second leg portions 44B, 46B of the respective contact legs 44, 46 may be dimensioned to extend outwardly from an end of the respective first leg portions 44A, 46A to establish the respective contact surfaces 54, 56. The second leg portion 44B of the first contact leg 44 may be established by the first pad 62. The second leg portion 46B of the second contact leg 46 may be established by the second pad 64.

One or more of the guide passages 52 may be established along the first and/or second alignment arms 48, 50. In implementations, third and fourth guide passages 52-3, 52-4 may be established along and may extend through the first alignment arm 48 (FIGS. 5-6). The second alignment arm 50 may be free of any guide passages 52. In implementations, one or more guide passages 52 may be established along a portion of the second alignment arm 50, such as along the paddle 66 (see, e.g., guide passage 52' shown in dash lines in FIG. 5).

Figure 8:
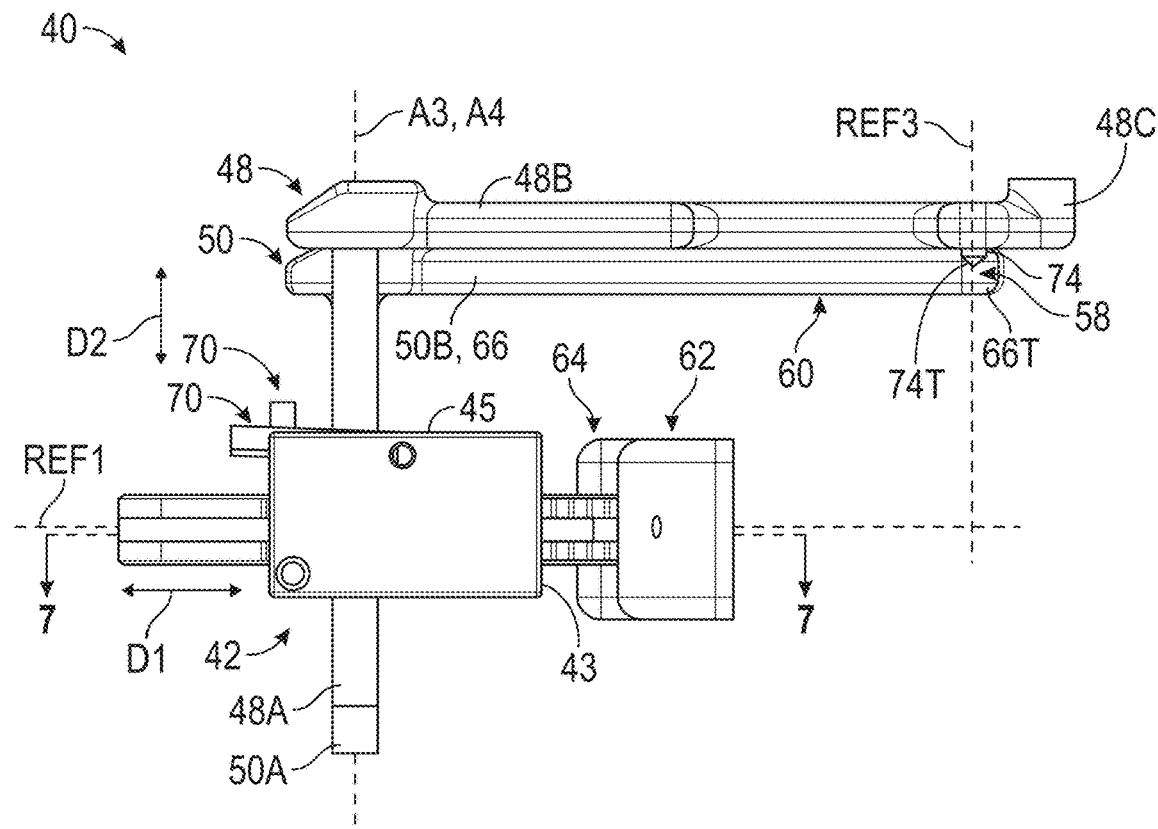
FIG. 8 illustrates a side (e.g., right) view of the assembly of FIG. 3.
Figure 9:
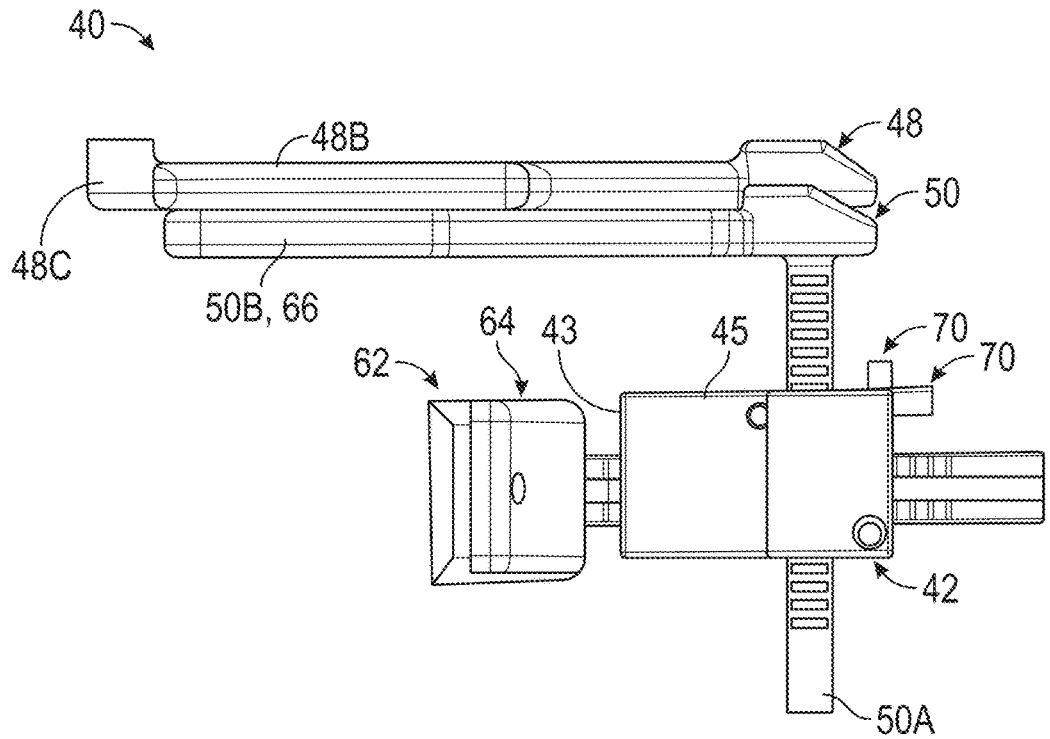
FIG. 9 illustrates another side (e.g., left) view of the assembly of FIG. 3.

Referring to FIGS. 8-9, with continuing reference to FIGS. 5-7, the alignment arms 48, 50 may include various geometries adapted to establish contact with a portion of bone or other tissue. The first alignment arm 48 may include a first arm portion 48A, second arm portion 48B and third arm portion 48C. The second alignment arm 50 may include a first arm portion 50A and second arm portion 50B. The first arm portions 48A, 50A may be dimensioned to be at least partially received along the respective interface passages 72 (see, e.g., FIGS. 6-7). In implementations, the first and second arm portions 48A, 48B of the first alignment arm 48 may join to establish a generally L shaped geometry (see e.g., FIG. 8). A geometry of the first arm portions 48A, 50A may be the same or may differ. The first and second arm portions 50A, 50B of the second alignment arm 50 may join to establish a generally L-shaped geometry (see, e.g., FIG. 9). A geometry of the second arm portions 48B, 50B may be the same or may differ. In implementations, the second arm portion 50B of the second alignment arm 50 may be established by the paddle 66.

The contact legs 44, 46 and alignment arms 48, 50 may be situated at various orientations relative to each other for establishing contact with the patient anatomy. Each of the first leg portions 44A, 46A of the first and second contact legs 44, 46 may be moveable in a first direction D1 (FIG. 8). In implementations, the direction D1 may be substantially parallel to the first axis A1 and/or the second axis A2 (see, e.g., FIG. 7). The first arm portions 48A, 50A of the alignment arms 48, 50 may be moveable in a second direction D2 (FIG. 8). In implementations, the second direction D2 may be substantially perpendicular or otherwise transverse to the first direction D1.

The first arm portions 48A, 50A of the respective alignment arms 48, 50 may extend outwardly from the second sidewall 45 of the guide body 42. Each of the first arm portions 48A, 50A may be received in a respective interface passage 72 of the guide body 42 (FIGS. 6-7). In implementations, each of the first arm portions 46A, 48A may be translatable along third and fourth axes A3, A4 of the respective interface passages 72 of the guide body 42 to establish a position of the engagement surfaces 58, 60 relative to the guide body 42 (FIGS. 6 and 8). The axes A3, A4 may be substantially parallel or transverse to each other. In implementations, the second direction D2 may be substantially parallel to the third axis A3 and/or the fourth axis A4.

Referring back to FIGS. 5-6, with continuing reference to FIGS. 8-9, the second arm portion 48B of the first alignment arm 48 may be dimensioned to interconnect the first and third arm portions 48A, 48C. The second and third arm portions 48B, 48C of the first alignment arm 48 may join at a junction 76. The second and third arm portions 48B, 48C may join at the junction 76 to establish a generally T-shaped geometry. A pair of the guide passages 52 may extend through the third arm portion 48C. In implementations, the third and fourth guide passages 52-3, 52-4 may extend through the third arm portion 48C on opposite sides of the junction 76. The paddle 66 may extend from the first arm portion 48A of the second alignment arm 50 to a terminal (e.g., free) end 66T. The alignment arm 48 may be dimensioned to extend past the terminal end 66T of the paddle 66 relative to the guide body 42. The terminal end 66T of the paddle 66 may be positioned between the guide body 42 and the third arm portion 48C of the first alignment arm 48. The paddle 66 may be utilized to accommodate anatomies of various shaped and sizes. The third arm portion 48C may be set at relatively closer distance to the anatomy to accommodate various contours of the anatomy that may cause the paddle 66 to be spaced at a relatively greater distance away from the specified insertion point of the respective guide element.

The first alignment arm 48 may include a protrusion 74. The protrusion 74 may extend inwardly from the third arm portion 48C of the first alignment arm 48. The protrusion 74 may include a terminal portion 74T. The terminal portion 74T may taper to a touchpoint that may establish the engagement surface 58 of the first alignment arm 48. The touchpoint may have various geometries, such as a point, a round, a substantially planar surface, or a patient-specific geometry dimensioned to substantially follow an articular and/or non-articular surface contour of the associated bone. In implementations, the protrusion 74 and junction 76 may be situated on opposite sides of the guide passage 52-3 (see, e.g., FIG. 6). In implementations, the assembly 40 may include a set of protrusions 74 differing in at least one dimension (e.g., length) to establish contact with the anatomy.

Referring to FIG. 8, the first and/or second alignment arms 48, 50 may be dimensioned to extend past and may overhang the first and/or second contact legs 44, 46 relative to the guide body 42. The alignment arms 48, 50 may be independently movable along a third reference plane REF3 (see also FIG. 6) relative to the guide body 42. The alignment arms 48, 50 may be dimensioned such that the guide body 42 may be spaced apart from the third reference plane REF3. The first and second alignment arms 48 and 50 may be dimensioned such that the third reference plane REF3 may be spaced apart from the guide body 42. In implementations, the engagement surface 58 of the first alignment arm 48 and the engagement surface 60 established by the paddle 66 may be movable in the second direction D2 along the third reference plane REF3. The engagement surface 58 of the first alignment arm 48 and the engagement surface 60 established by the paddle 66 may be aligned with the third reference plane REF3 at each position of the alignment arms 48, 50 relative to the guide body 42. The third reference plane REF3 may be transverse to the first reference plane REF1. The first and second pads 62, 64 may be movable in the first direction D1 towards the third reference plane REF3. The first and second pads 62, 64 may be spaced apart from the third reference plane REF3 at each position of the first and second contact legs 44, 46 relative to the guide body 42. The engagement surfaces 58, 60 established by the alignment arms 48, 50 may be moveable in the second direction D2 towards the first reference plane REF1. The engagement surfaces 58, 60 established by the alignment arms 48, 50 may be spaced apart from the first reference plane REF1 at each position of the first and second alignment arms 48, 50 relative to the guide body 42.

Figure 10:
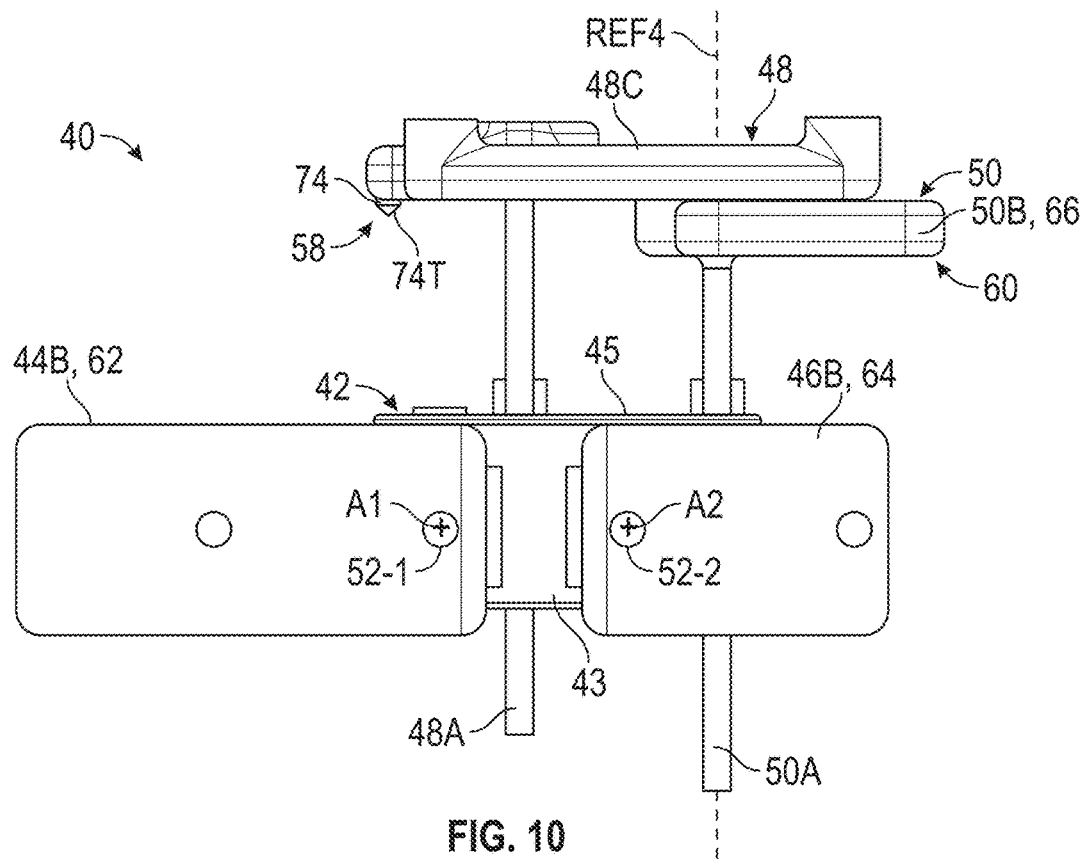
FIG. 10 illustrates a side (e.g., front or distal) view of the assembly of FIG. 3.
Figure 11:
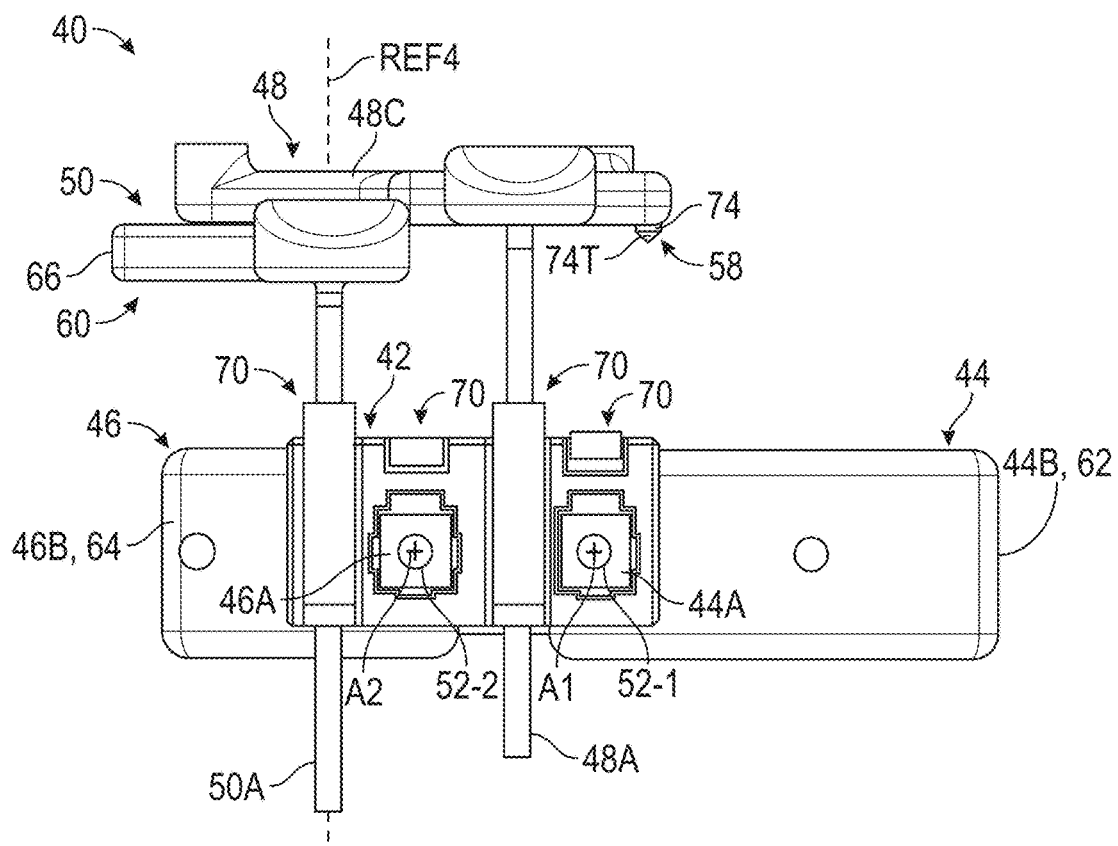
FIG. 11 illustrates another side (e.g., back or proximal) view of the assembly of FIG. 3.

Referring to FIGS. 10-11, the second pad 64, the paddle 66, and the third arm portion 48C of the first alignment arm 48 may be aligned along a fourth reference plane REF4 (see also FIGS. 5-6). The fourth reference plane REF4 may intersect and extend through the first and/or second sidewalls 43, 45 of the guide body 42. The configuration of the first and second pads 64, 66 relative to the alignment arms 48, 50 may establish a relatively compact arrangement, which may reduce the amount of exposure to access the joint space and position the assembly 40 relative to the anatomy.

In the implementation of FIG. 6, the guide passage 52-3 and the first engagement surface 58 may be situated on a first side of the fourth reference plane REF4, but the guide passage 52-4 and the engagement surface 60 established by the paddle 66 may be situated on a second, opposite side of the fourth reference plane REF4 at each position of the alignment arms 48, 50 relative to the guide body 42. The terminal end 66T of the paddle 66 may be positioned between the guide body 42 and the guide passages 52-3, 52-4 relative to the fourth reference plane REF4. A fifth reference plane REF5 may bisect or otherwise intersect the guide body 42 (see also FIGS. 5 and 7). The fifth reference plane REF5 may intersect and extend through the first and/or second sidewalls 43, 45 of the guide body 42. The guide passage 52-3 and the engagement surface 58 may be situated on a first side of the fifth reference plane REF5, but the guide passage 52-4 and the engagement surface 60 established by the paddle 66 may be situated on a second, opposite side of the fifth reference plane REF5 at each position of the alignment arms 48, 50 relative to the guide body 42. The terminal end 66T of the paddle 66 may be positioned between the guide body 42 and the guide passages 52-3, 52-4 relative to the reference plane REF5. In the implementation of FIG. 5, the fourth guide passage 52-4 and the paddle 66 may be aligned along a second reference plane REF2. The second reference plane REF2 may be offset from the guide body 42. The second reference plane REF2 may be substantially parallel or may be transverse to the fourth reference plane REF4 and/or fifth reference plane REF5.

Figure 12:
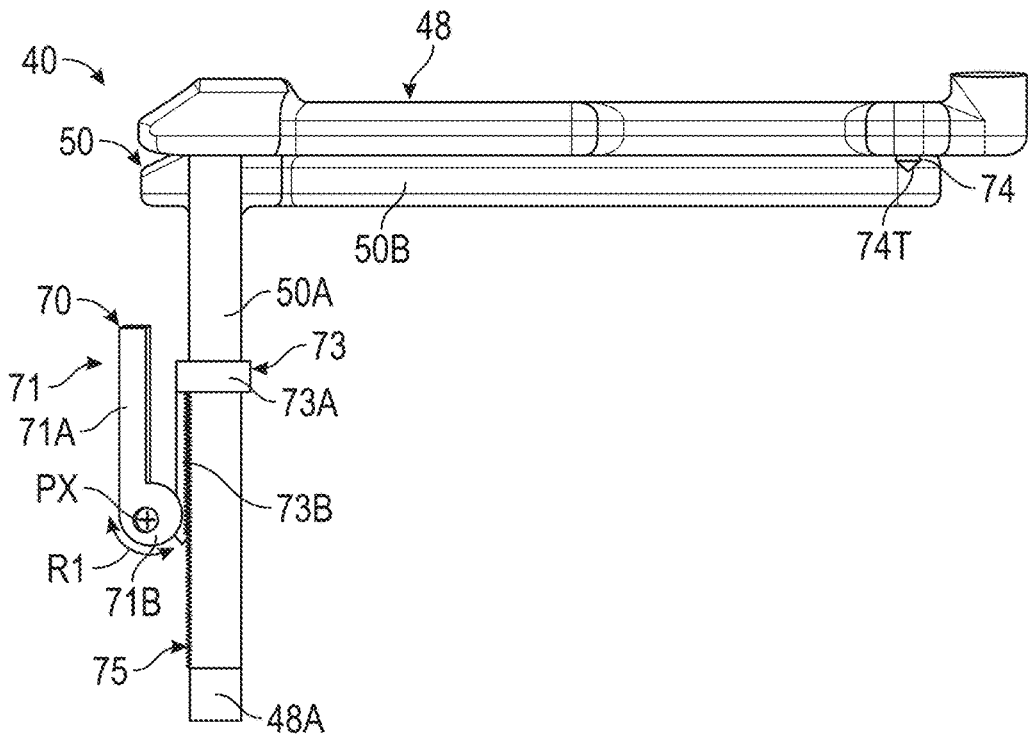
FIG. 12 illustrates a lock mechanism positioned relative to an alignment arm of the assembly of FIG. 8.
Figure 13:
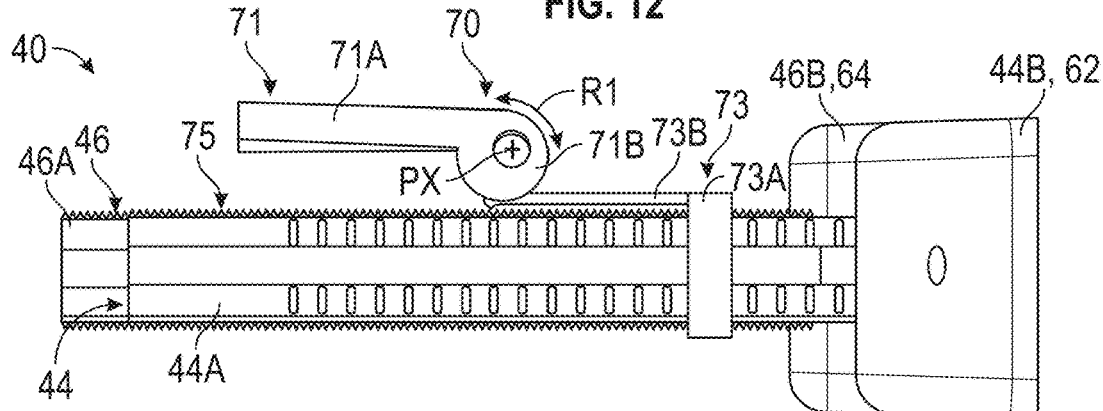
FIG. 13 illustrates another lock mechanism positioned relative to a contact leg of the assembly of FIG. 8.
Figure 14:
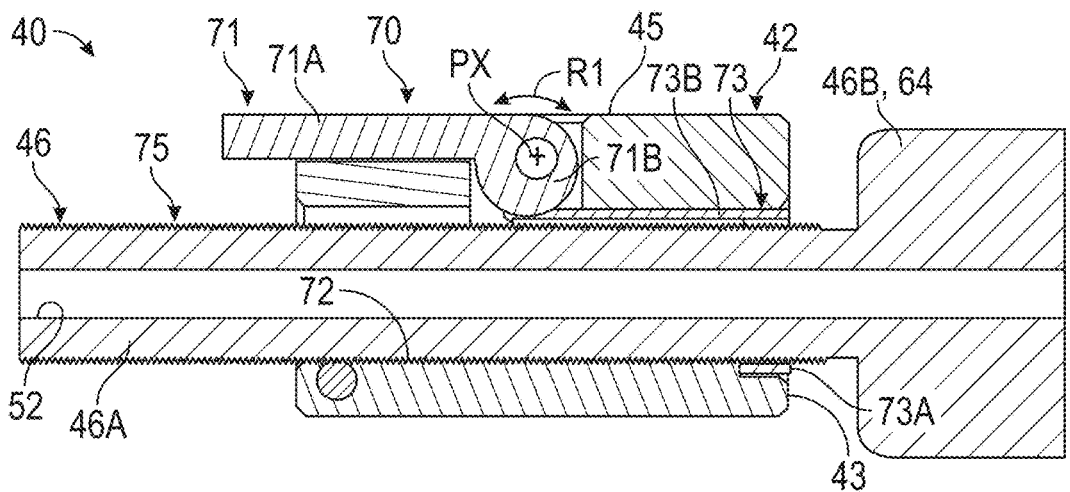
FIG. 14 illustrates a sectional view of the lock mechanism of FIG. 13.

Referring to FIGS. 12-14, with continuing reference to FIGS. 4 and 8, in implementations each lock mechanism 70 may establish a ratchet for fixing a position of the contact legs 44, 46 and alignment arms 48, 50 relative to the guide body 42. Each lock mechanism 70 may include a locking arm 71 and a sleeve 73. The locking arm 71 may include an arm portion 71A extending from a cam portion 71B. The sleeve 73 may include a sleeve body 73A and an engagement tab 73B extending from the sleeve body 73A. The sleeve body 73A may be carried by the leg portion 46A/46B or arm portion 48A/48B of the respective contact leg 44/46 or alignment arm 48/50. A set of grooves 75 may be established along each leg portion 46A, 46B and arm portion 48A, 48B. The locking arm 71 may be rotatable in a direction R1 above a respective pivot axis PX between an unlocked position and a locked position. Rotating the locking arm 71 between the unlocked and locked positions may cause the cam portion 71B to urge the engagement tab 73B into engagement with a selected one of the grooves 75 to set a position of the contact legs 44, 46 and alignment arms 48, 50 relative to the guide body 42. The set position may be associated with a respective parameter of the surgical plan 23.

Figure 15:
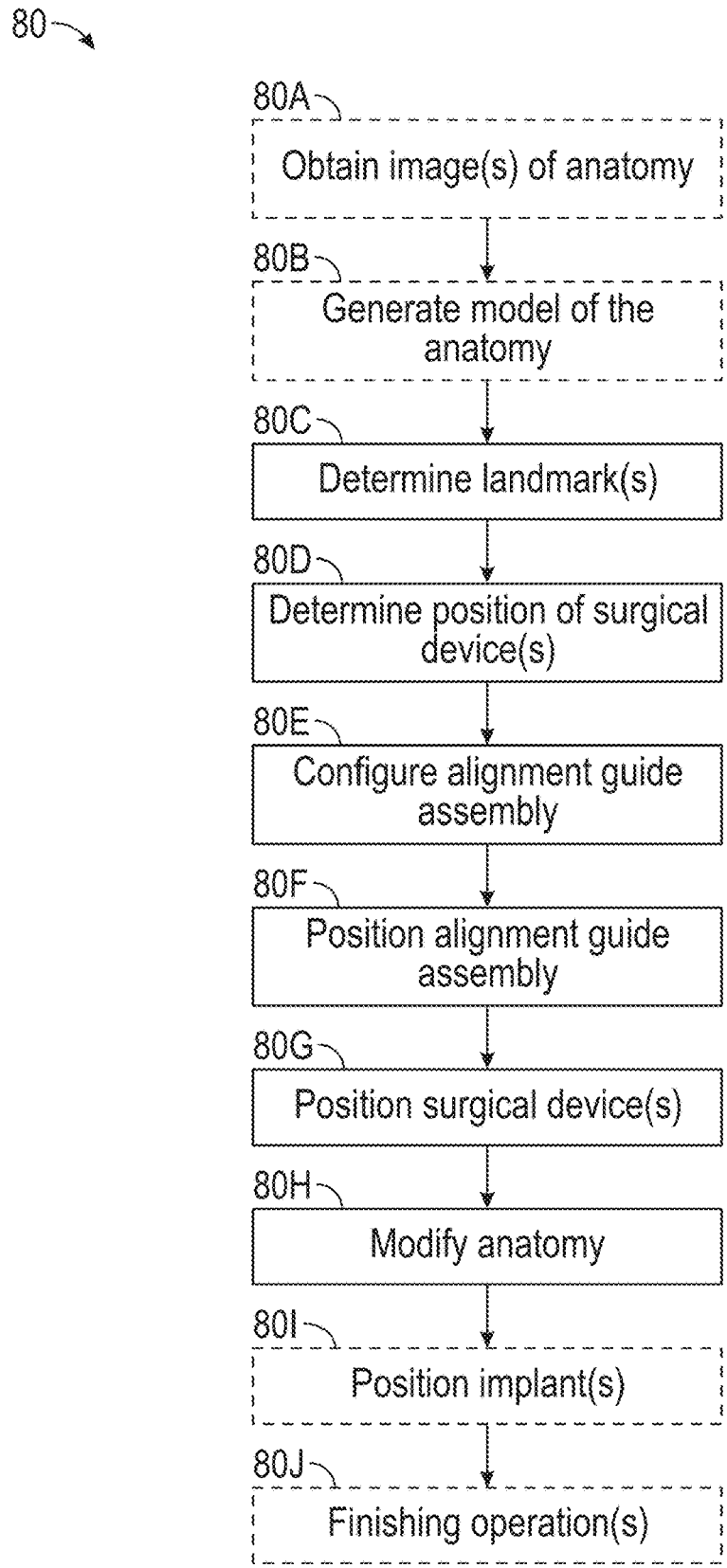
FIG. 15 illustrates a method of planning and implementing an orthopaedic procedure.

FIG. 15 illustrates an exemplary method of planning and performing an orthopaedic procedure in a flowchart 80. The method 80 may be utilized to pre-operatively plan and perform an arthroplasty for restoring functionality to knees, ankles, shoulders, hips and other joints having advanced cartilage disease. The method 80 may be utilized with any of the systems, instrumentation and orthopedic implants disclosed herein, including the system 10 and/or alignment guide assembly 40. The method 80 may be utilized to configure one or more instruments for performing an orthopaedic procedure according to an associated surgical plan for a patient. The system 10 may be utilized to establish a surgical plan 23 for treating the patient. Fewer or additional steps than are recited below could be performed within the scope of this disclosure, and the recited order of steps is not intended to limit this disclosure. Reference is made to the system 10 and assembly 40 for illustrative purposes. Each of the steps of the method 80 may be performed virtually within the system 10 utilizing selected anatomical model(s) 20, implant model(s) 21 and/or transfer model(s) 22 and/or may be performed physically utilizing a physical instance of the assembly 40 associated with a respective transfer model 22.

Referring to FIGS. 1-2 and 15, at step 80A one or more images 18 of the anatomy may be obtained. The images 18 may include at least a portion of a joint and/or one or more associated bones. The anatomy may include any of the bones and joints disclosed herein. In implementations, the images 18 may include at least a portion of a long bone such as a distal femur and/or adjacent bone(s) of a joint such as a proximal tibia. Various techniques may be utilized to obtain images of the anatomy, including any of the techniques disclosed herein.

Figure 16:
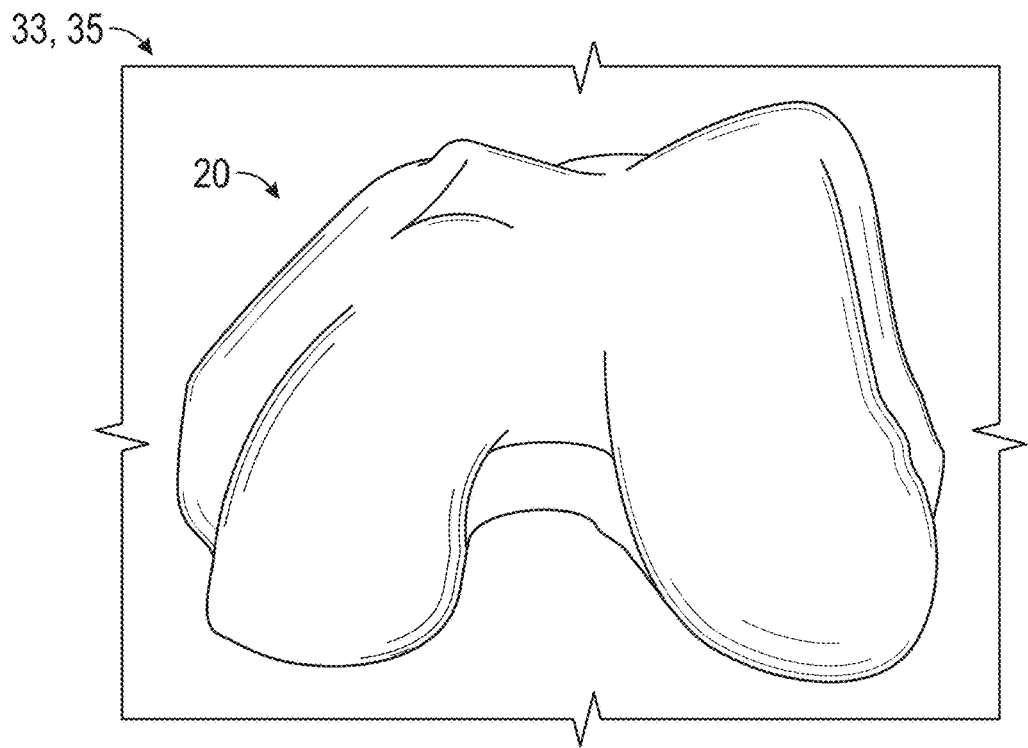
FIG. 16 illustrates an anatomical model of an anatomy.
Figure 17:
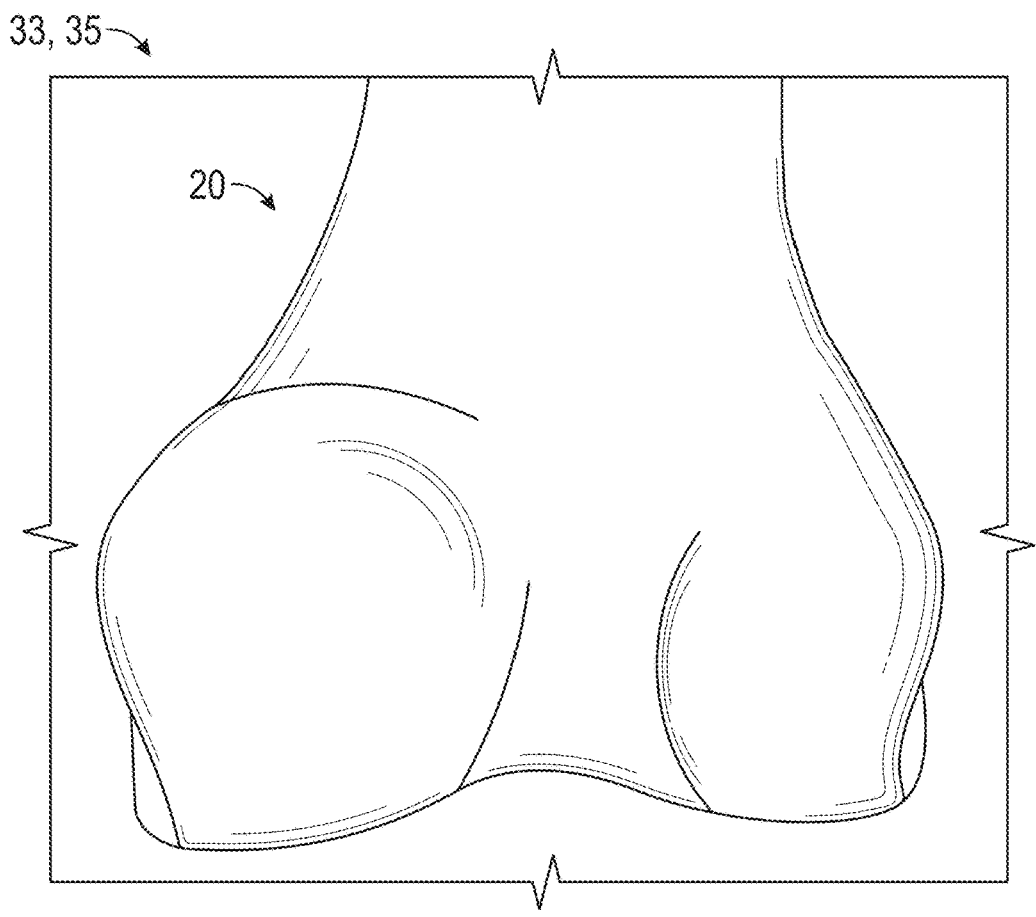
FIG. 17 illustrates another view of the anatomical model of FIG. 16.

Referring to FIGS. 16-17, with continuing reference to FIGS. 1-2 and 15, an anatomical model 20 of the anatomy may be generated at step 80B. The anatomical model 20 may be a two and/or three dimensional representation of the corresponding anatomy, such as a distal femur of the patient. Various techniques may be utilized to generate the anatomical model 20, such as with the system 10.

Figure 18:
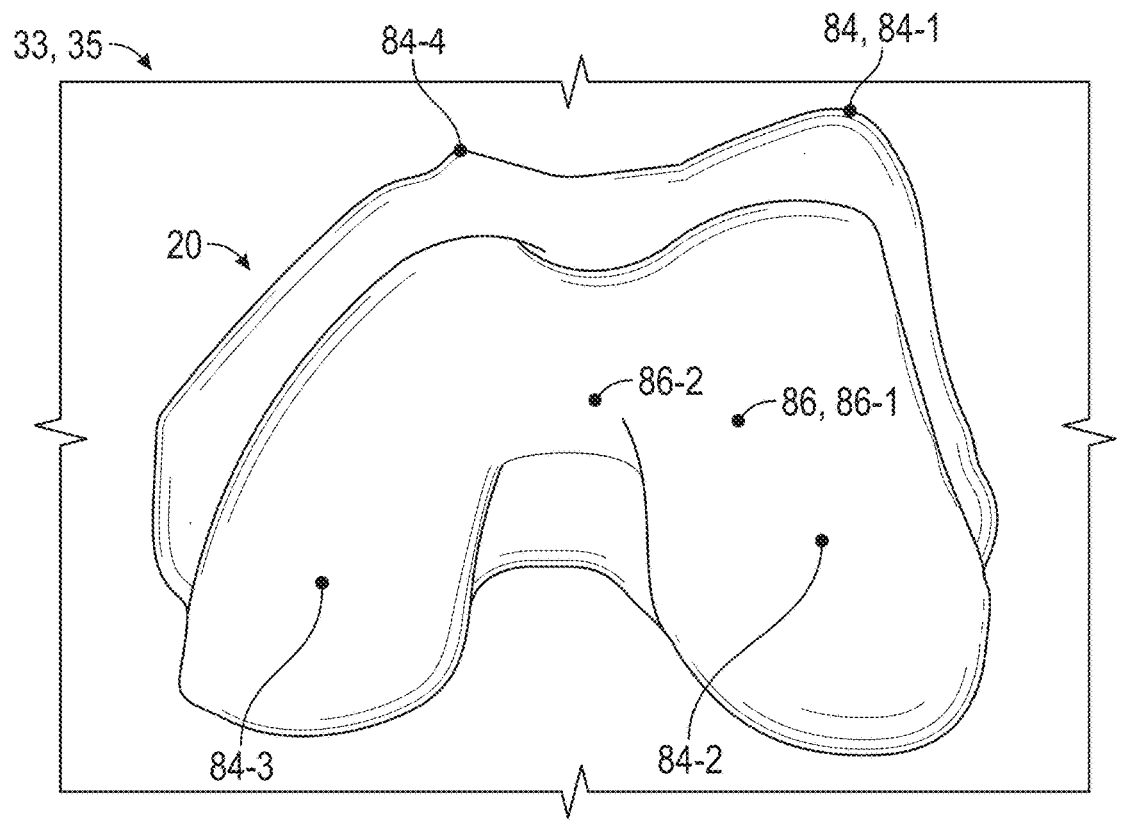
FIG. 18 illustrates landmarks and insertion locations along the anatomical model of FIG. 16.
Figure 19:
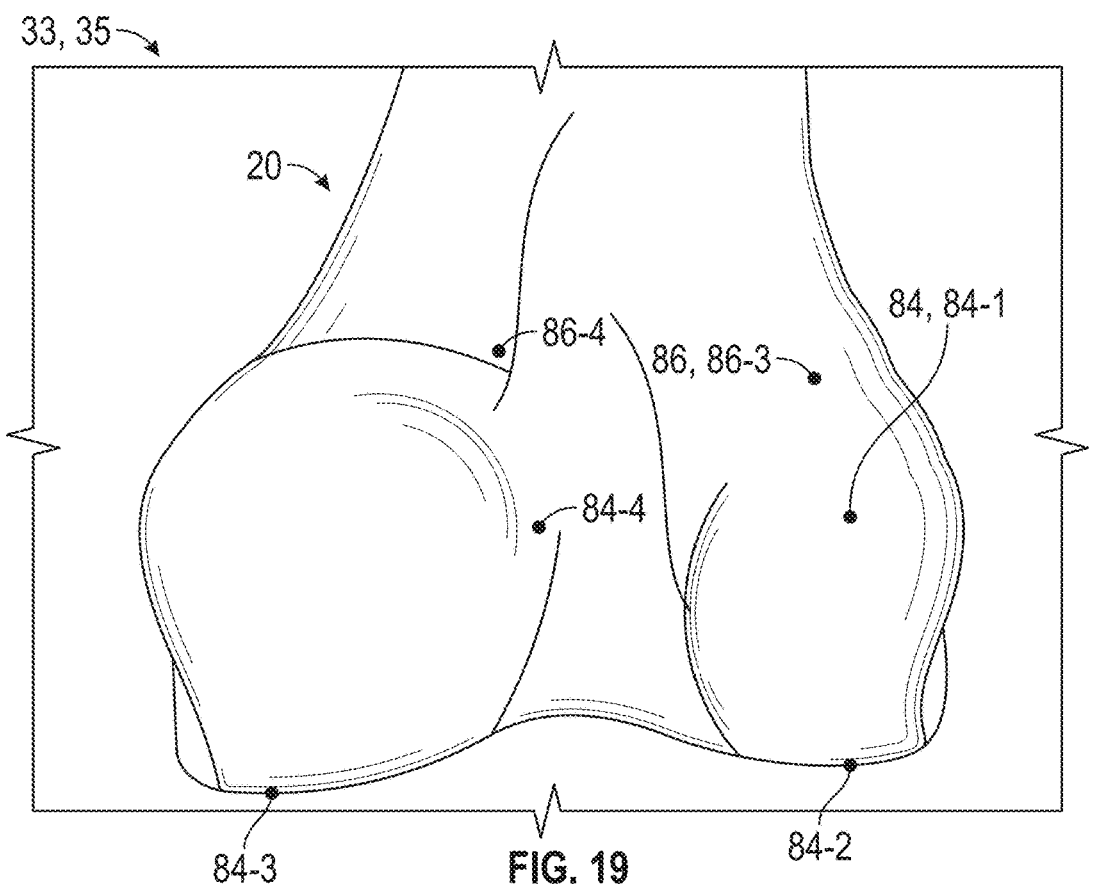
FIG. 19 illustrates landmarks and insertion locations along the anatomical model of FIG. 17.

Referring to FIGS. 18-19, with continuing reference to FIGS. 1-2 and 15-17, a position of one or more anatomical landmarks (e.g., fiduciary landmarks or contact points) 84 may be determined at step 80C. Each of the landmarks 84 may be associated with a respective position along an articular or non-articular surface of a bone. In implementations, step 80C may include determining respective positions of a set of anatomical landmarks 84 along articular and/or non-articular surfaces of the anatomical model 20 corresponding to respective positions along one or more bones of the anatomy. The set of anatomical landmarks 84 may be associated with a common bone, such as a distal femur, or adjacent bones such as a distal femur and proximal tibia of a knee joint. The set of anatomical landmarks 84 may be distributed along an articular surface. The articular surface may extend along a distal femur. The anatomical landmarks 84 may vary based on characteristics of the anatomy, including dimensions of the anatomy, cartilage thickness and condition (e.g., erosion), etc.

Various landmarks 84 may be specified along the anatomy. In implementations, the set of anatomical landmarks 84 may include first through fourth anatomical landmarks 84-1 to 84-4. The first landmark 84-1 may be associated with an anterior aspect of a lateral condyle. The second landmark 84-2 may be associated with a distal aspect of the lateral condyle. The third landmark 84-3 may be associated with a distal aspect of a medial condyle. The fourth landmark 84-4 may be associated with an anterior aspect of the medial condyle. The first and fourth landmarks 84-1, 84-4 may be associated with a most anterior aspect of the respective lateral and medial condyle. The second and third landmarks 84-2, 84-3 may be associated with a most distal aspect of the respective lateral and medial condyle. The lateral and medial condyle may be located along a long bone, such as a distal femur. It should be understood that fewer or more than four anatomical landmarks 84 may be determined, such as only one anatomical landmark 84.

Step 80C may include determining the respective position of each landmark 84 relative to the anatomical model 20. Various techniques may be utilized to determine the landmarks 84. The spatial module 30 may be configured to determine a position of each of the landmarks 84 based on a profile of the anatomical model 20. The surgeon or user may interact with the anatomical model 20 to specify the position of each landmark 84. In implementations, the surgeon or clinical user may interact with the user interface 33 to specify the landmark 84 relative to the anatomical model 20. The landmarks 84 may be specified in a surgical plan 23 for the associated anatomy.

At step 80D, a position of one or more surgical devices may be determined. The surgical devices can include any of the surgical devices disclosed herein, such as one or more guide elements insertable in bone including pins, K-wires, etc., and other surgical devices such as one or more drills, burrs, saw blades, etc. (see, e.g., guide elements GE of FIG. 28). Step 80D may include determining respective insertion points (e.g., locations) 86 of one or more guide elements along the anatomical model 20 of the respective bone. Step 80D may include determining an orientation or trajectory of the surgical device(s) at the respective insertion points 86. In implementations, the insertion points 86 may include first through fourth insertion points 86-1 to 86-4. The insertion points 86-1 to 86-4 may be established along the anatomy by positioning surgical devices in the respective guide passages 52-1 to 52-4 of the assembly 40. It should be understood that fewer or more than four insertion points 86 may be established, such as only one insertion point 86. The insertion points 86 may be specified in a surgical plan 23.

Figure 20:
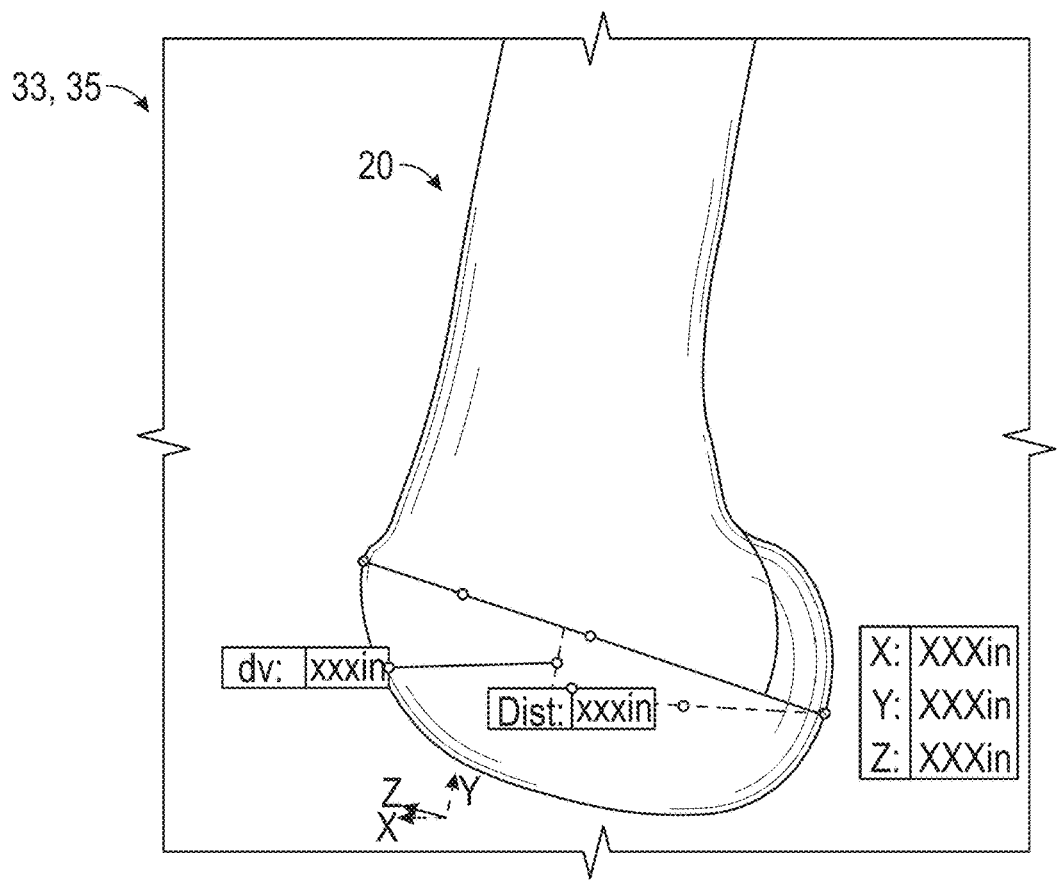
FIG. 20 illustrates exemplary measurements of the anatomical model of FIGS. 16-17.
Figure 21:
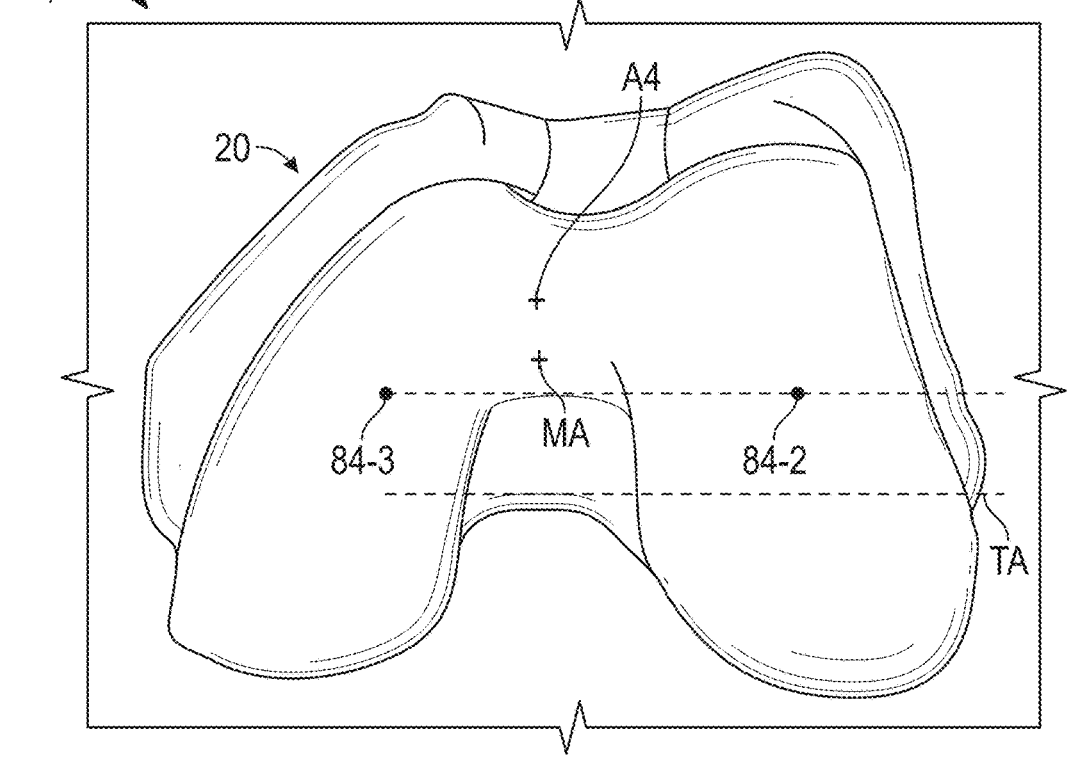
FIG. 21 illustrates various axes established along the anatomical model of FIG. 16.

Various techniques may be utilized to determine the insertion points 86, respective positions and orientations of the surgical device(s), and position and orientation of the assembly 40. Referring to FIG. 20, with continuing reference to FIG. 15, step 80D may include determining a size of the respective bone associated with the anatomical model 20 (FIGS. 1-2). The determined size may be utilized in selection of an implant. Referring to FIG. 21, with continuing reference to FIGS. 1-2 and 15, step 80D may include determining one or more rotations of the treated bone, such as flexion/extension, internal/external and/or *varus*/valgus rotations. The rotations may be specified in a surgical plan 23. The specified rotations may be determined based on various characteristics of the bone or joint, such as an anatomical axis AA and/or mechanical axis MA, the most distal points of the femur (e.g., anatomical landmarks 84-2, 84-3), and/or a transepicondylar axis TA of the femur. The transepicondylar axis TA may be defined as a line between the most medial and most lateral prominences of the epicondyles. The spatial module 30 may be configured to determine the axes AA, MA and/or TA. In implementations, the surgeon or clinical user may interact with the user interface 33 to specify and/or adjust the position of the axes AA, MA and/or TA relative to the anatomical model 20.

Figure 22:
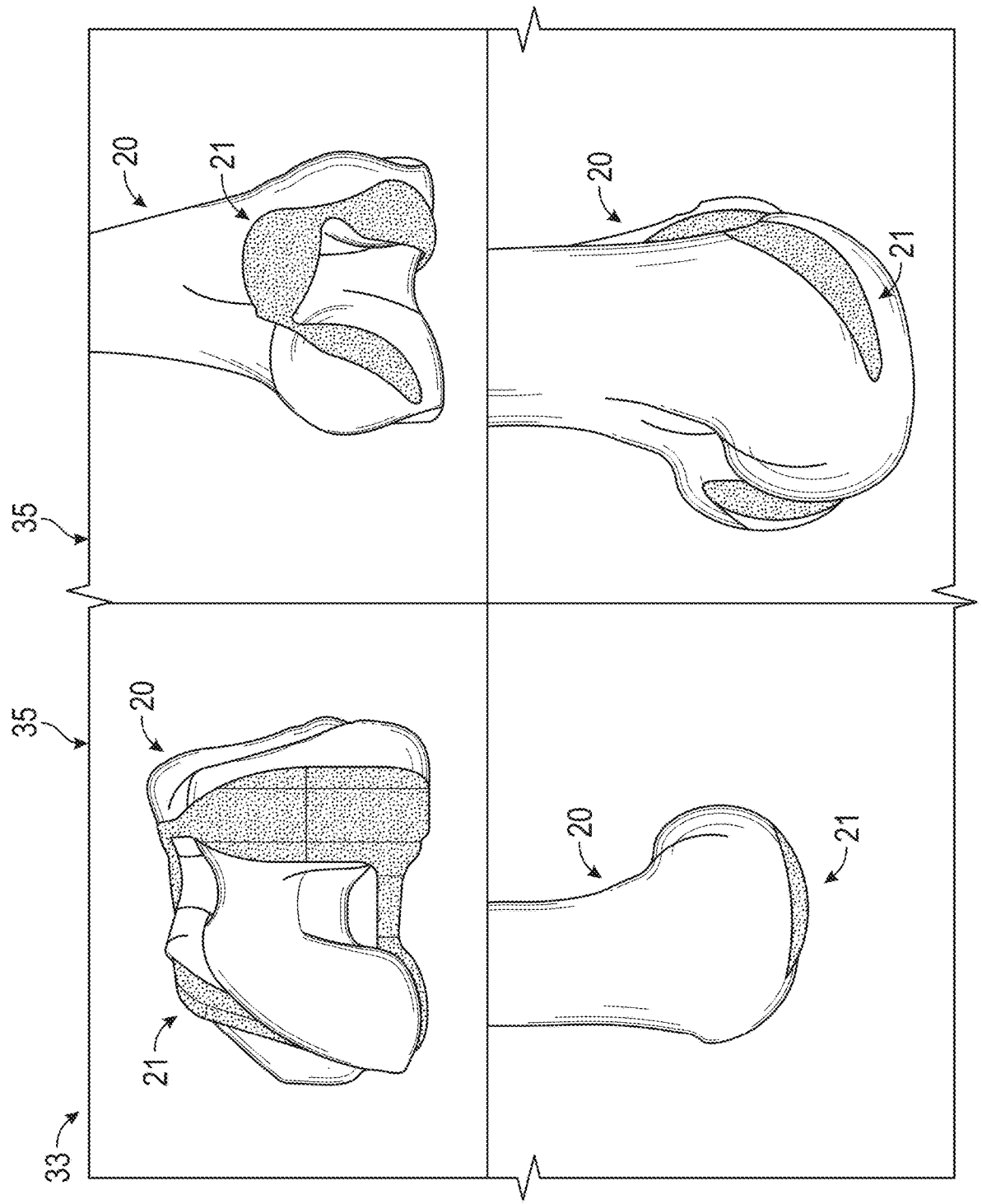
FIG. 22 illustrates an implant model positioned relative to the anatomical model of FIGS. 16-17.

Referring to FIG. 22, with continuing reference to FIGS. 1-2, 15 and 18-19, step 80D may include positioning implant model(s) 21 relative to the anatomical model 20. The insertion points 86 and respective orientations of the surgical device(s) may be associated with respective features of the implant model 21. The spatial module 30 may be configured to position each implant model 21 relative to the anatomical model 20. In implementations, the surgeon or clinical user may interact with the user interface 33 to specify and/or adjust the position of the implant model(s) 21 relative to the anatomical model 20. The system 10 may be configured to generate one or more settings for a transfer model 22. The settings may be specified in a surgical plan 23 and may be utilized to configure the assembly 40.

Figure 23:
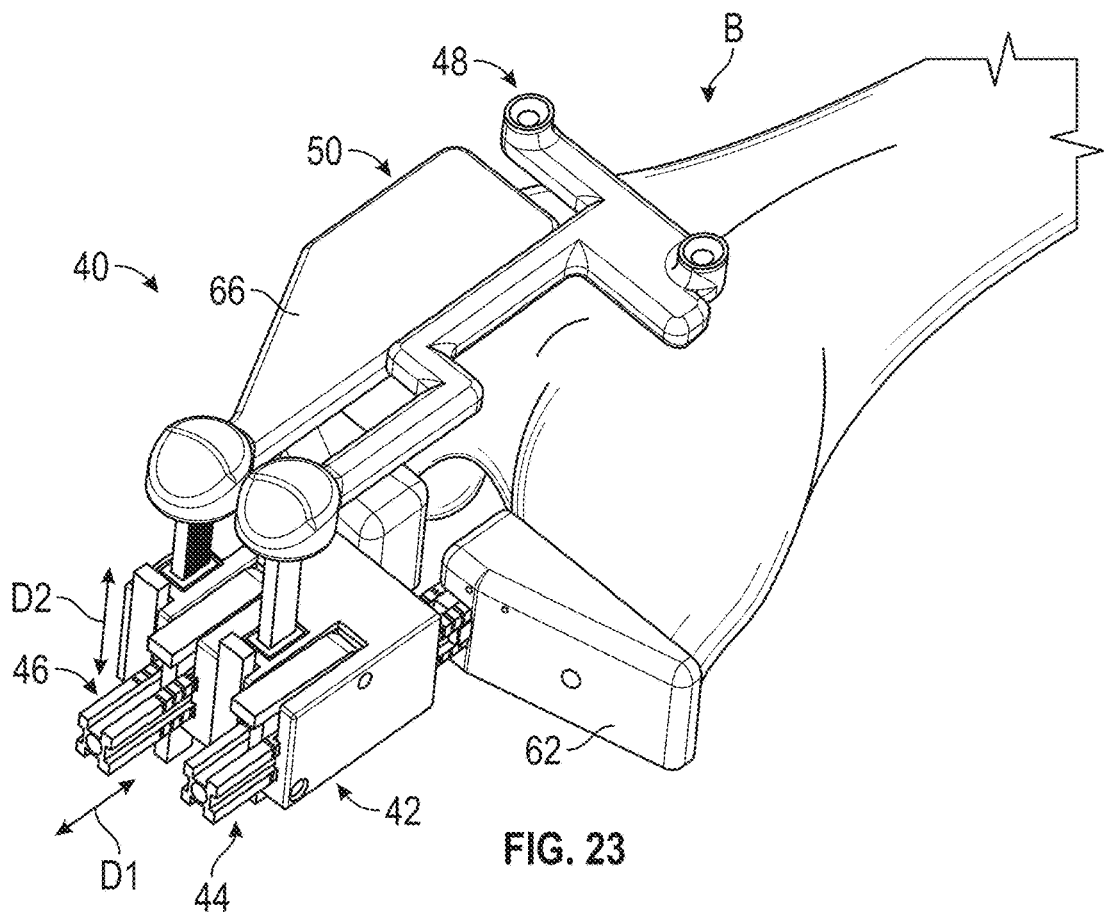
FIG. 23 illustrates a perspective view of the assembly of FIG. 3 positioned relative to a bone.

Referring to FIG. 23, with continuing reference to FIGS. 15 and 18-19, the alignment guide assembly 40 may be configured at step 80E. Step 80E may be performed within the system 10 utilizing a selected transfer model 22 or may be performed utilizing a physical instance of the assembly 40 associated with a respective transfer model 22. Step 80E may include configuring the assembly 40 according to one or more parameters that may be specified in the surgical plan 23. The parameters may include a position of the first contact leg 44, second contact leg 46, first alignment arm 48 and/or second alignment arm 50 relative to the guide body 42 of the assembly 40. Configuring the assembly 40 at step 80E may include setting a position of each of the contact legs 44, 46 and alignment arms 48, 50 relative to the guide body 42 based on the determined positions of the set of anatomical landmarks 84. The surgeon or clinical user may configure the assembly 40 according to parameters in the surgical plan 23. The surgeon or clinical user may manually set and/or adjust the position of components of the assembly 40 pre-operatively and/or intraoperatively to position the assembly 40 relative to the anatomy in a desired position and orientation.

Step 80E may include independently adjusting the positions of the first and second contact legs 44, 46 relative to the guide body 42. The contact legs 44, 46 may be moved in the first direction D1 to respective positions specified in the surgical plan 23. The alignment arms 48, 50 may be moved in the second direction D2 to respective positions specified in the surgical plan 23. Step 80E may include independently adjusting the positions of the first and second alignment arms 48, 50 relative to the guide body 42. The assembly 40 may include indicia (e.g., ruler and indicator) to set the position of each of the contact legs 44, 46 and alignment arms 48, 50 relative to the guide body 42. The position of the contact legs 44, 46 may be set to set the specified flexion and extension of an associated implant.

In implementations, step 80E may include selecting the first and second contact legs 44, 46 from a set of contact legs interchangeably mountable to the guide body 42 and/or selecting the first and second alignment arms 48, 50 from a set of alignment arms interchangeably mountable to the guide body 42. Two or more of the contact legs associated with the same respective anatomical landmark of the set of anatomical landmarks may have at least one different dimension (e.g., size, surface profile, etc.). Two or more of the alignment arms associated with the same respective anatomical landmark of the set of anatomical landmarks have at least one different dimension (e.g., size, surface profile, etc.). The surgeon or assistant may select the contact legs 44, 46 and alignment arms 48, 50 from a kit (see, e.g., FIG. 33).

Figure 24:
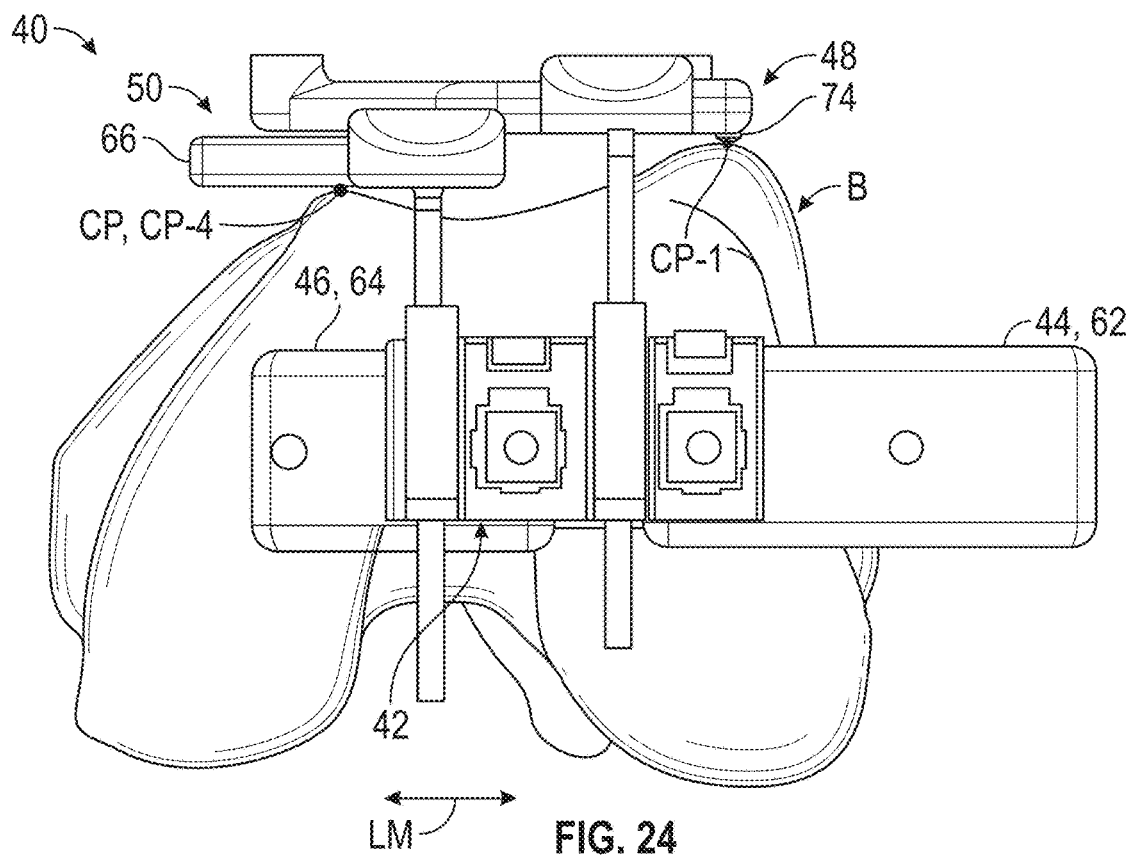
FIG. 24 illustrates the assembly of FIG. 11 positioned relative to the bone.
Figure 25:
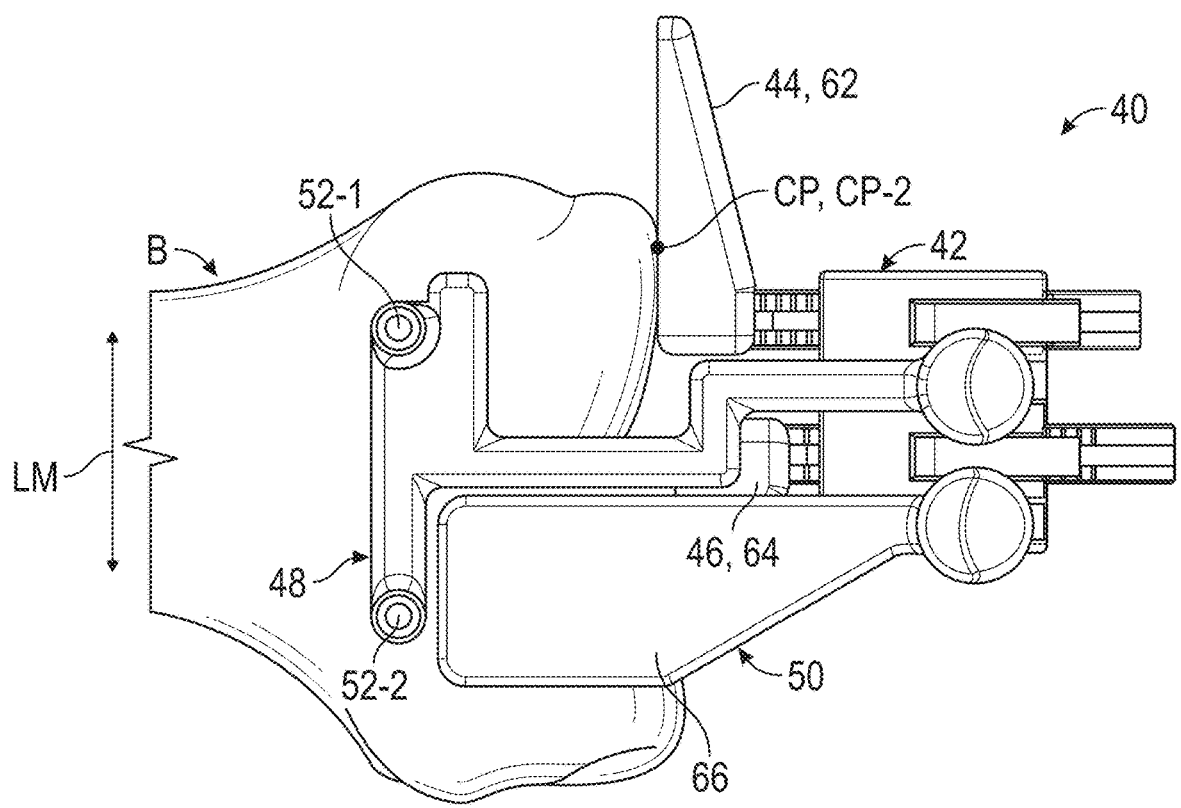
FIG. 25 illustrates the assembly of FIG. 5 positioned relative to the bone.
Figure 26:
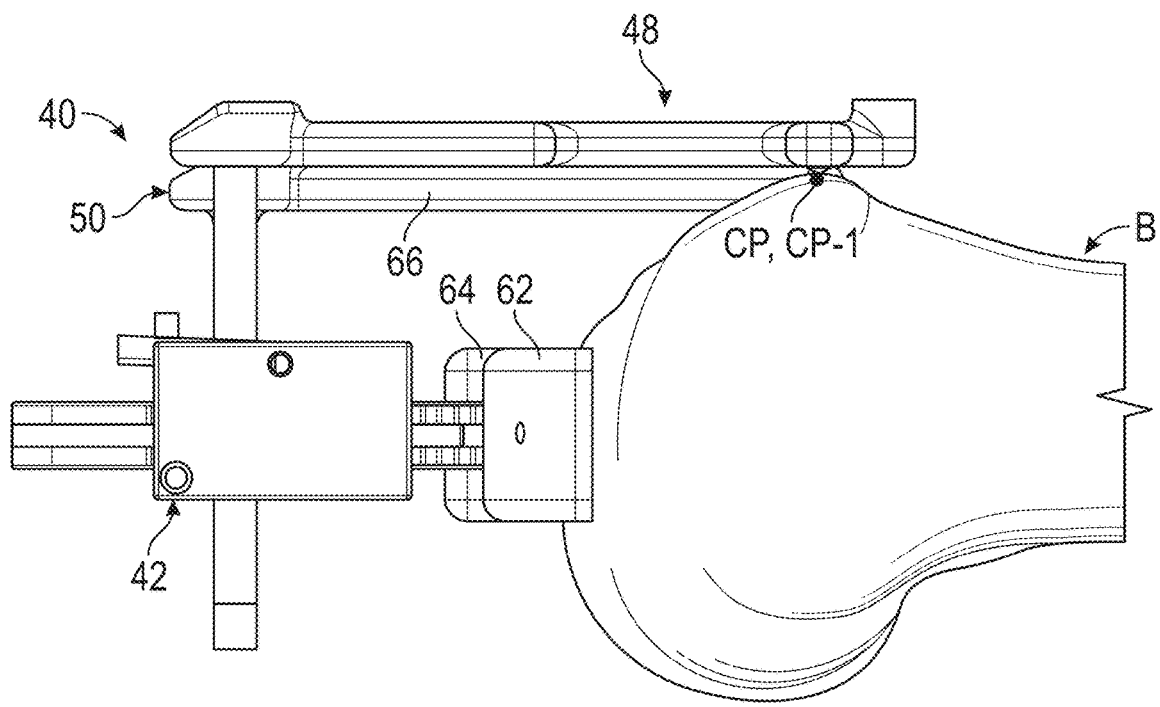
FIG. 26 illustrates the assembly of FIG. 8 positioned relative to the bone.
Figure 27:
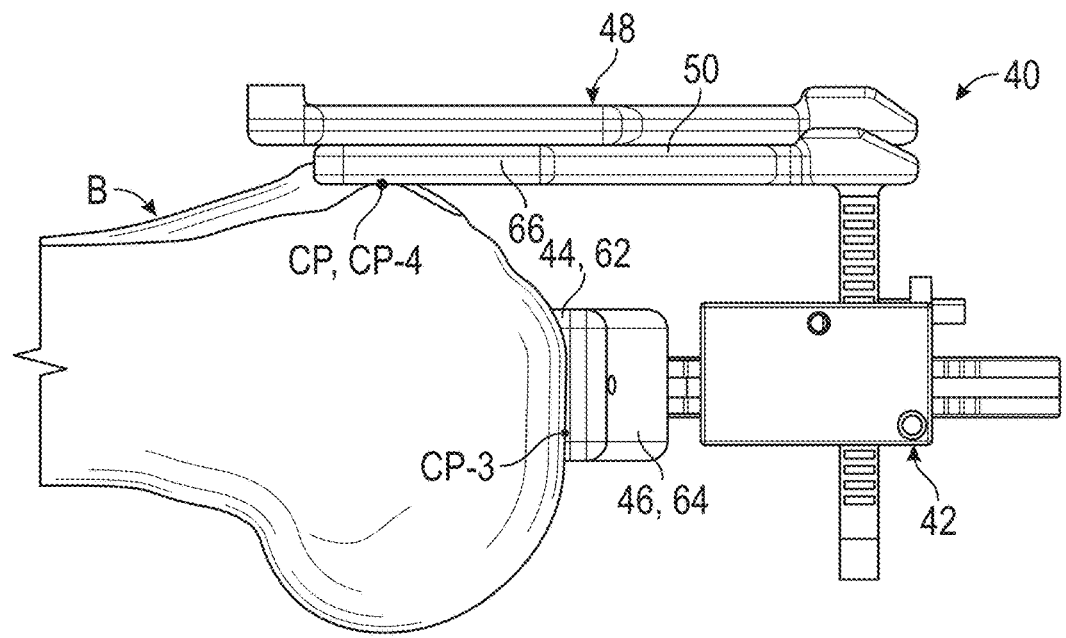
FIG. 27 illustrates the assembly of FIG. 9 positioned relative to the bone.

Referring to FIGS. 24-27, with continuing reference to FIGS. 15 and 23, at step 80F the assembly 40 may be positioned relative to the anatomy at the surgical site. Step 80F may be performed within the system 10 utilizing a selected transfer model 22 or may be performed utilizing a physical instance of the assembly 40 associated with a respective transfer model 22. Step 80F may include positioning the assembly 40 relative to at least one bone B. The bone B may be associated with the anatomical model 20. The alignment guide assembly 40 may be positioned relative to the bone B according to the set positions such that the engagement surfaces 58, 60 of the first and second alignment arms 48, 50 and/or the first and second contact legs 44, 46 establish contact with the respective anatomical landmarks 84. The assembly 40 may be configured prior to, concurrently with, and/or subsequent to establishing contact between the contact surfaces 54, 56 and engagement surfaces 58, 60 and respective contact points CP along the bone B. The contact points CP may substantially correspond to the set of anatomical landmarks 84 (FIGS. 18-19). Step 80F may include establishing contact between the assembly 40 and the bone B at a first contact point CP-1 (FIGS. 24 and 26), a second contact point CP-2 (FIG. 25), a third contact point CP-3 (FIG. 27) and/or a fourth contact point CP-4 (FIGS. 24 and 27). The first through fourth contact points CP-1 to CP-4 may substantially correspond to the respective anatomical landmarks 84-1 to 84-4 determined at step 80C. Step 80F may occur such that the assembly 40 may span between the lateral condyle and medial condyle of the bone B (e.g., FIG. 24). The assembly 40 may be at least partially aligned with, and may span across, an intercondylar notch established between the lateral condyle and medial condyle relative to a lateral-medial direction LM of the bone B (e.g., FIG. 24).

Step 80F may include establishing contact at the contact points CP-1 to CP-4 between the bone B and the first and second contact legs 44, 46 and the first and second alignment arms 48, 50 according to an order in which the positions of the set of anatomical landmarks 84 are determined at step 80C. In implementations, contact between the assembly 40 and the bone B may be sequentially established in a clockwise or counterclockwise order at the contact points CP-1 to CP-4 (e.g., relative to a plane of the page of FIG. 24). Positioning the assembly 40 may include moving the protrusion 74 of the first alignment arm 48 into contact with the anterior aspect of the lateral condyle of the bone B (e.g., FIG. 24), then moving the first pad 62 into contact with the distal aspect of the lateral condyle (e.g., FIG. 25), then moving the second pad 64 into contact with the distal aspect of the medial condyle of the bone B (e.g., FIG. 27), and then moving the paddle 66 of the second alignment arm 50 into contact with the anterior aspect of the medial condyle (e.g., FIG. 27), although another (e.g., opposite) order may be utilized to establish contact between the assembly 40 and the bone B. Establishing contact according to the order disclosed herein may be utilized to improve reproducibility of implementing the surgical plan 23.

Positioning the assembly 40 at step 80F to establish contact with the anatomy at the contact points CP may occur such that the first and second alignment arms 48, 50 may extend past and may overhang the first and second contact pads 62, 64 (see, e.g., FIGS. 25-27). Step 80F may occur such that the first guide passage 52-1 may be offset in the lateral-medial direction LM from the paddle 66 and may occur such that the second guide passage 52-2 may be aligned in the lateral-medial direction LM with the paddle 66 (see, e.g., FIG. 25).

Figure 28:
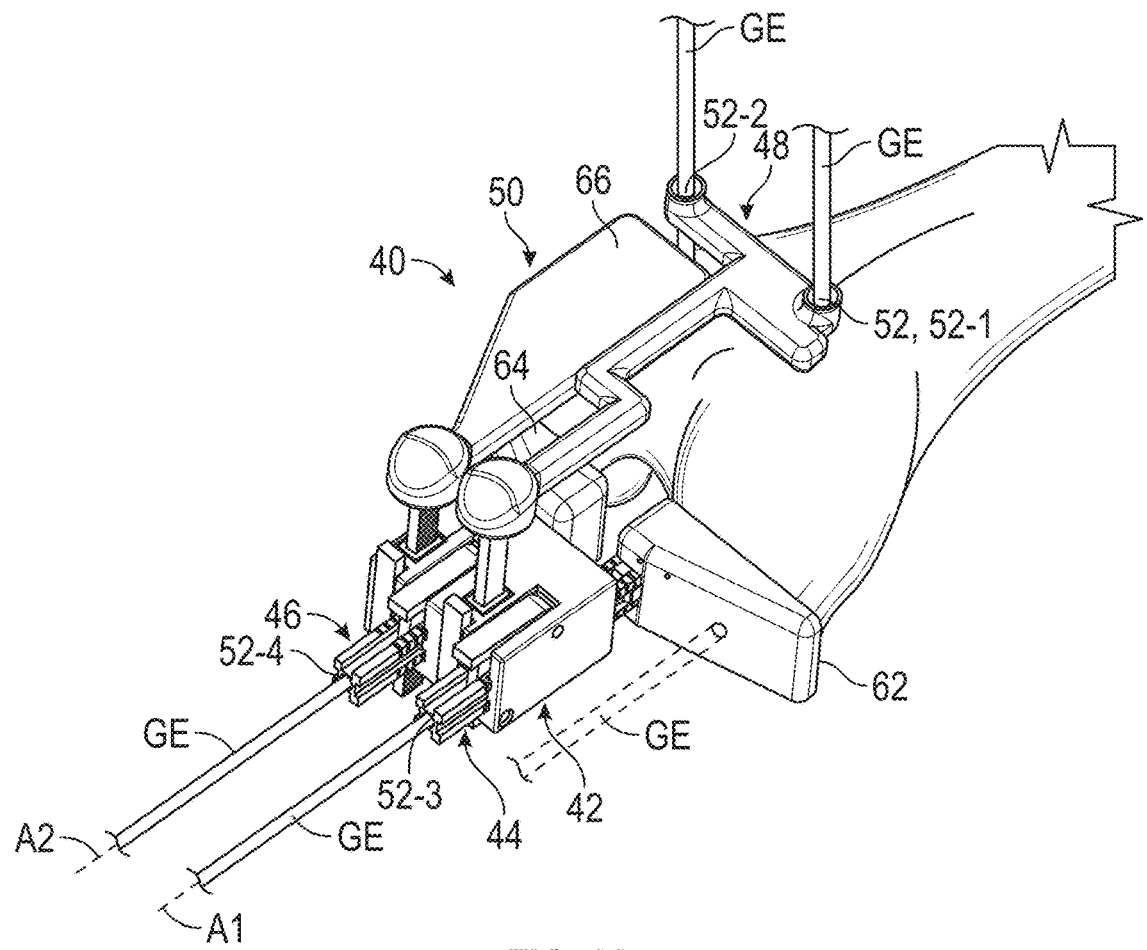
FIG. 28 illustrates a perspective view of surgical devices positioned with the assembly of FIG. 23 relative to the bone.
Figure 29:
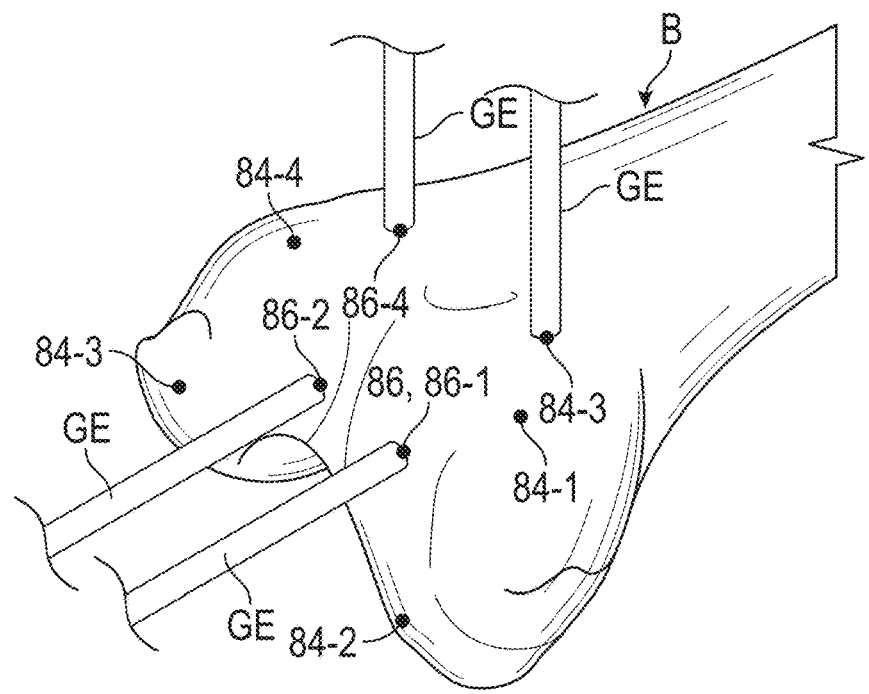
FIG. 29 illustrates a perspective view of the surgical devices of FIG. 28 with the removed from the surgical site.

Referring to FIG. 28, with continuing reference to FIG. 15, at step 80G one or more surgical devices may be positioned relative to the bone B with the assembly 40. Step 80G may be performed within the system 10 utilizing a selected transfer model 22 or may be performed utilizing a physical instance of the assembly 40 associated with a respective transfer model 22. The surgical devices may include any of the surgical devices disclosed herein, such as one or more guide elements GE. Step 80G may include inserting one or more guide elements GE through the respective guide passages 52 of the assembly 40 and into the bone B at the respective insertion positions 86 (see, e.g., FIG. 29). The insertion positions 86 of the guide elements GE may including insertion points 86-1 to 86-4 that may substantially correspond to the respective insertion points (e.g., locations) 86-1 to 86-4 determined at step 80D (FIGS. 18-19). Referring to FIG. 29, the assembly 40 may be removed from the surgical site subsequent to placement of the guide elements GE. In implementations, the insertion points 86-3, 86-4 may be established along an intermediate (e.g., central) portion of the anterior of the distal femur. The insertion points 86-1, 86-2 may be substantially aligned with the respective insertion points 86-3, 86-4 relative to a reference plane, which may extend in the medial-lateral and anterior-posterior directions.

Figure 30:
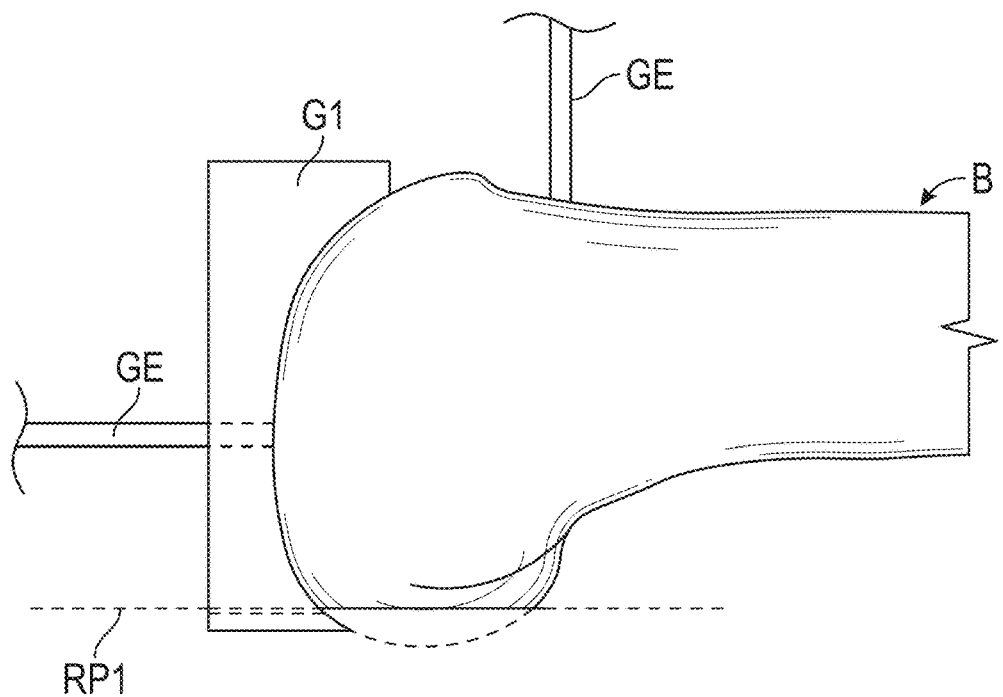
FIG. 30 illustrates a first guide positioned with the surgical devices of FIG. 29 relative to the bone.
Figure 31:
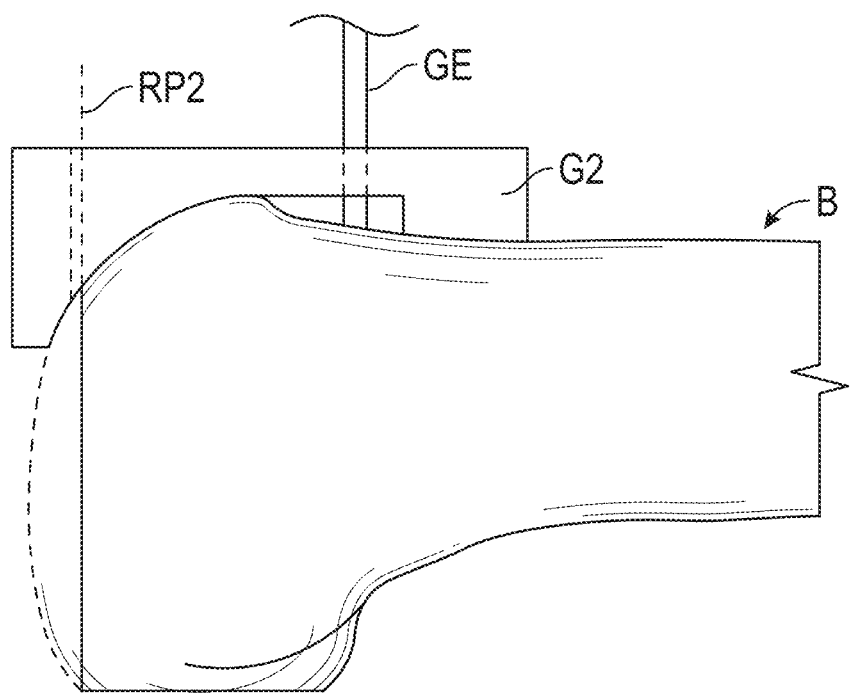
FIG. 31 illustrates a second guide positioned with the surgical devices of FIG. 29 relative to the bone.

Referring to FIGS. 30-31, with continuing reference to FIG. 15, the anatomy may be modified at step 80H. Step 80H may include position one or more guides, such as guides G1, G2, relative to the bone B. The guides G1, G2 may be dimensioned to position or more surgical instruments relative to the bone B, including any of the surgical instruments disclosed herein such as a saw blade or drill. In implementations, the guides G1, G2 may be a single guide. The guides G1, G2 may be dimensioned to receive one or more of the guide elements GE to position the guides G1, G2 relative to the bone B. Step 80H may include resecting the bone B along one or more resection planes RP1, RP2.

Figure 32:
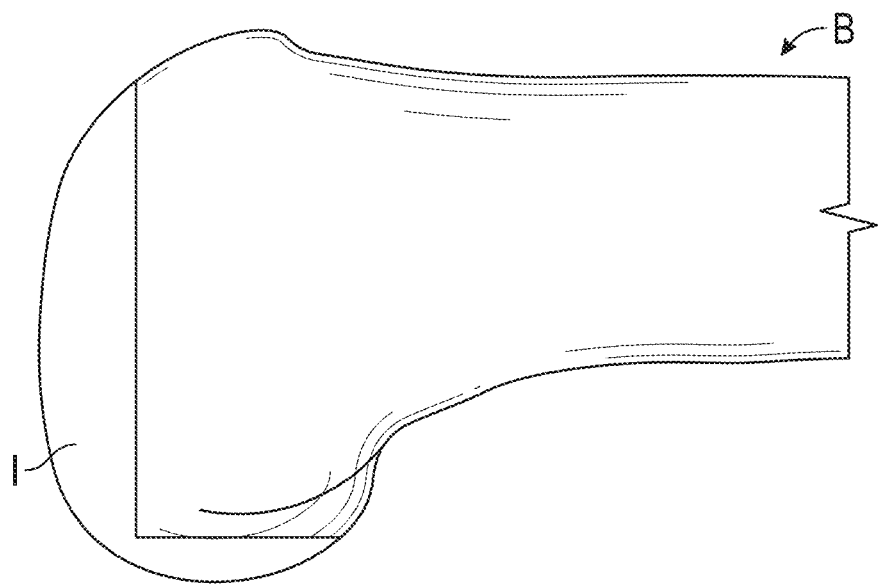
FIG. 32 illustrates an implant positioned relative to the modified bone.

Referring to FIG. 32, with continuing reference to FIG. 15, at step 80I at least one implant I may be positioned along the modified bone B. The implant I may be associated with a respective implant model 21, such as the implant model 21 of FIG. 22.

At step 80J, the surgeon or assistant may perform one or more finishing operations. Step 80J may include securing the implant I to the bone, such as with one or more fasteners, and closing an incision previously formed in the patient to expose the bone B or joint.

The novel devices and methods of this disclosure can be utilized to precisely place one or more guide members for guiding placement of surgical instruments and other devices relative to a surgical site. The disclosed surgical instruments may be reusable and may be configured according to settings established in a surgical plan. The surgeon or assistant may configure the alignment guide based on the settings. The settings may include specified positions of contact members of the alignment guide assembly for facilitating contact with bone or other tissue at contact points that may substantially correspond to respective anatomical points or other landmarks specified in the surgical plan. The techniques disclosed herein can improve precision in placement of the respective guide members for improving accuracy in modifying the anatomy according to the surgical plan established for the patient. The disclosed systems and methods can be utilized to reduce operative time and complexity.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A transfer guide assembly for an orthopaedic procedure comprising:
a guide body;
a plurality of guide passages dimensioned to receive respective guide elements insertable in bone;
first and second alignment arms coupled to the guide body, the first alignment arm including a first engagement surface, the second alignment arm including a paddle having a second engagement surface, and a geometry of the first engagement surface differing from a geometry of the second engagement surface;

first and second contact legs coupled to the guide body, the first and second contact legs including respective first and second pads, and the first and second pads having respective first and second contact surfaces; and wherein the first and second engagement surfaces and the first and second contact surfaces are dimensioned to contact bone.

2. The assembly as recited in claim 1, wherein:
the first and second contact legs are interchangeable with a set of contact legs differing in at least one dimension from each other; and
the first alignment arm is interchangeable with a set of alignment arms differing in at least one dimension from each other.

3. The assembly as recited in claim 2, wherein:
the first and second alignment arms and the first and second contact legs are independently adjustable relative to the guide body in response to actuating a respective lock mechanism.

4. The assembly as recited in claim 1, wherein the plurality of guide passages comprise:
first and second guide passages extending through the first alignment arm; and
third and fourth guide passages extending through the respective first and second contact legs.

5. The assembly as recited in claim 4, wherein:
a reference plane intersects the guide body;
the first guide passage and the first engagement surface are situated on a first side of the reference plane, but the second guide passage and the second engagement surface of the paddle are situated on a second side of the reference plane; and
a terminal end of the paddle is positioned between the guide body and the first and second guide passages relative to the reference plane.

6. The assembly as recited in claim 5, wherein:
the guide body includes a bone facing sidewall and a second sidewall;
the reference plane extends through the bone facing and second sidewalls;
the first and second contact legs extend outwardly from the bone facing sidewall; and
the first and second alignment arms extend outwardly from the second sidewall.

7. The assembly as recited in claim 1, wherein:
the first alignment arm includes a protrusion that tapers to a touchpoint establishing the first engagement surface; and
the second engagement surface of the paddle has a substantially planar geometry.

8. The assembly as recited in claim 1, wherein:
the first and second alignment arms are independently moveable along a first reference plane relative to the guide body;
the first engagement surface of the first alignment arm and the paddle are aligned with, and are movable along, the first reference plane; and
the guide body is spaced apart from the first reference plane.

9. The assembly as recited in claim 8, wherein:
the first and second contact legs are independently moveable along a second reference plane relative to the guide body, and the first reference plane is transverse to the second reference plane;
the first and second pads are spaced apart from, but are moveable in a first direction towards, the first reference plane;

the first and second engagement surfaces of the first and second alignment arms are spaced apart from, but are moveable in a second direction towards, the second reference plane.

10. The assembly as recited in claim 1, wherein at least one of the first engagement surface, the second engagement surface, the first contact surface and the second contact surface is dimensioned to substantially conform to a surface contour of a bone.

11. The assembly as recited in claim 1, wherein the first and second engagement surfaces of the first and second alignment arms and the first and second contact surfaces of the first and second pads are dimensioned to contact articular surfaces of a distal femur.

12. The assembly as recited in claim 1, wherein:
the first engagement surface of the first alignment arm is dimensioned to contact an anterior aspect of a first condyle;
the second engagement surface of the second alignment arm is dimensioned to contact an anterior aspect of a second condyle;
the first contact surface of the first pad is dimensioned to contact a distal aspect of the first condyle; and
the second contact surface of the second pad is dimensioned to contact a distal aspect of the second condyle.

13. The assembly as recited in claim 1, wherein:
the first and second alignment arms are dimensioned to extend past and overhang the first and second contact legs relative to the guide body.

14. The assembly as recited in claim 13, wherein:
the first alignment arm includes first, second and third arm portions, the second arm portion interconnects the first and third arm portions, the first and second arm portions join to establish a generally L-shaped geometry, and the second and third arm portions join at a junction to establish a generally T-shaped geometry;
a pair of the guide passages extend through the third arm portion on opposite sides of the junction;
the first alignment arm includes a protrusion extending inwardly from the third arm portion to establish the first engagement surface, and the junction and the protrusion are situated on opposite sides of the first guide passage; and
the second engagement surface of the paddle has a substantially planar geometry.

15. A kit for an orthopaedic procedure comprising:
a guide body;
a set of contact legs differing in at least one dimension from each other and interchangeably securable to the guide body, wherein each of the contact legs includes a pad having a respective contact surface dimensioned to contact bone;
a set of first alignment arms differing in at least one dimension from each other and interchangeably securable to the guide body, each of the first alignment arms including a first engagement surface dimensioned to contact bone;
a set of second alignment arms each including a paddle having a second engagement surface, and a geometry of the first engagement surface differing from a geometry of the second engagement surface; and
wherein a selected pair of the contact legs, a selected one of the first alignment arms, and a selected one of the second alignment arms are securable to the guide body to establish an assembly, the assembly including a plurality of guide passages dimensioned to receive respective guide elements insertable in bone.

16. The kit as recited in claim 15, wherein:
the selected one of the first alignment arm and the selected one of the second alignment arms are dimensioned to extend past and overhang the selected pair of the contact legs relative to the guide body in an installed position.

17. A method of performing an orthopaedic procedure comprising:
configuring an alignment guide, wherein:
the alignment guide includes a guide body, first and second alignment arms and first and second contact legs coupled to the guide body, and a plurality of guide passages;
the first alignment arm includes a first engagement surface, the second alignment arm includes a paddle establishing a second engagement surface, a geometry of the first engagement surface differs from a geometry of the second engagement surface, and the first and second contact legs include respective first and second pads; and
the configuring step includes setting a position of each of the first and second alignment arms and the first and second contact legs relative to the guide body based on positions of a set of anatomical landmarks;
positioning the alignment guide relative to a bone according to the set positions such that the engagement surfaces of the first and second alignment arms and the first and second contact legs establish contact with contact points along the bone that substantially correspond to the respective anatomical landmarks, and then inserting a plurality of guide elements through the respective guide passages and into the bone at insertion positions that substantially correspond to respective insertion locations.

18. The method as recited in claim 17, further comprising:
determining the positions of the set of anatomical landmarks along an articular surface of a bone prior to the configuring step;
determining the insertion locations prior to the configuring step; and
wherein the configuring step includes independently adjusting the positions of the first and second alignment arms and the first and second contact legs relative to the guide body.

19. The method as recited in claim 17, further comprising:
determining the positions of the set of anatomical landmarks along an articular surface of a bone prior to the configuring step;
wherein the positioning step includes establishing contact between the first and second alignment arms and the first and second contact legs and the bone according to an order of the determining of the positions of the set of anatomical landmarks; and
wherein the set of anatomical landmarks are distributed along an articular surface that extends along a distal femur, and the set of anatomical landmarks include an anterior aspect of a lateral condyle, an anterior aspect of a medial condyle, a distal aspect of the lateral condyle, and a distal aspect of the medial condyle.

20. The method as recited in claim 17, wherein the configuring step comprises:
selecting the first and second contact legs from a set of contact legs interchangeably mountable to the guide body, wherein two or more of the contact legs associated with the same respective anatomical landmark of the set of anatomical landmarks differ in at least one dimension from each other; and
selecting at least one of the first and second alignment arms from a set of alignment arms interchangeably mountable to the guide body, wherein two or more of the alignment arms associated with the same respective anatomical landmark of the set of anatomical landmarks differ in at least one dimension from each other.

\* \* \* \* \*